US006722797B1

(12) United States Patent
Piccinino, Jr.

(10) Patent No.: US 6,722,797 B1
(45) Date of Patent: Apr. 20, 2004

(54) PHOTOGRAPHIC PROCESSING DRUM HAVING A CIRCULAR MEDIA HOLDING CYLINDER AND A LINEAR DRYER

(75) Inventor: Ralph L. Piccinino, Jr., Rush, NY (US)

(73) Assignee: Eastman Kodak Company, Rochester, NY (US)

( * ) Notice: Subject to any disclaimer, the term of this patent is extended or adjusted under 35 U.S.C. 154(b) by 60 days.

(21) Appl. No.: 10/307,787

(22) Filed: Dec. 2, 2002

(51) Int. Cl.[7] .............................. G03B 7/00; G03D 3/04

(52) U.S. Cl. ....................... 396/579; 396/634; 396/635; 355/27

(58) Field of Search ................................ 396/579, 612, 396/617, 622, 626, 633–635; 355/27–30; 134/64 P, 122 P; 34/273, 318, 369, 618

(56) References Cited

U.S. PATENT DOCUMENTS

| | | | | |
|---|---|---|---|---|
| 3,792,651 A | | 2/1974 | Banks | 396/635 |
| 3,986,537 A | | 10/1976 | Wilhere | 141/198 |
| 4,005,463 A | | 1/1977 | Kowalski | 396/634 |
| 4,013,412 A | | 3/1977 | Mukae | 205/794.5 |
| 4,178,088 A | | 12/1979 | Harding | 396/635 |
| 4,269,501 A | | 5/1981 | Griffith et al. | 396/635 |
| 4,277,159 A | | 7/1981 | Descotes | 396/635 |
| 4,311,380 A | * | 1/1982 | Cutter | 396/622 |
| 4,431,294 A | | 2/1984 | Baker | 396/635 |
| 4,829,330 A | * | 5/1989 | Yamada et al. | 396/619 |
| RE34,188 E | | 3/1993 | Kuzyk et al. | 396/626 |
| 5,349,412 A | | 9/1994 | Miyasaka | 396/604 |

* cited by examiner

*Primary Examiner*—D. Rutledge
(74) *Attorney, Agent, or Firm*—David A. Novais

(57) ABSTRACT

The present invention relates to a photographic processor that includes a circular processing drum that is adapted to process photographic media. The processor also includes a circular cylinder that defines a holding or cueing cylinder. The circular cylinder has a circular media path therein and is adapted to received the processed photographic media from the circular processing drum to hold or cue the processed photographic media therein prior to drying. The processor also includes a dryer that is provided at an outlet of the circular cylinder for drying the processed media as the media exits the cylinder.

10 Claims, 30 Drawing Sheets

PHOTOGRAPHIC PROCESSING DRUM HAVING A CIRCULAR MEDIA HOLDING CYLINDER AND A LINEAR DRYER

CROSS REFERENCE TO RELATED APPLICATIONS

The present application is related to the following patent applications: U.S. patent application Ser. No. 10/027,382 filed Dec. 21, 2001, now U.S. Pat. No. 6,485,202, entitled PHOTOGRAPHIC PROCESSOR AND METHOD OF OPERATION; U.S. patent application Ser. No. 10/027,381 filed Dec. 21, 2001, now U.S. Pat. No. 6,485,204, entitled PHOTOGRAPHIC PROCESSOR HAVING AN ADJUSTABLE DRUM; U.S. patent application Ser. No. 10/108,141 filed Mar. 27, 2002, now U.S. Pat. No. 6,517,263, entitled PHOTOGRAPHIC PROCESSOR HAVING SIDE BY SIDE PROCESSING PATHS AND METHOD OF OPERATION; U.S. patent application Ser. No. 10/185,185 filed Jun. 28, 2002, entitled THERMAL MANAGEMENT DRUM FOR A PHOTOGRAPHIC PROCESSOR; U.S. patent application Ser. No. 10/218,807 filed Aug. 15, 2002, now U.S. Pat. No. 6,599,037, entitled ULTRASONIC CLEANING IN BATCH PHOTOPROCESSING EQUIPMENT; U.S. patent application Ser. No. 10/241,359 filed Sep. 11, 2002 entitled HOTORAPHIC PROCESSING DRUM HAVING A METERING BLADE ASSEMBLY; U.S. patent application Ser. No. 10/242,124 filed Sep. 12, 2002, now U.S. Pat. No. 6,545,705, entitled PHOTOGRAPHIC PROCESSOR HAVING A WASHING ASSEMBLY; U.S. patent application Ser. No. 10/281,710 filed Oct. 28, 2002, entitled PHOTOGRAPHIC PROCESSING DRUM HAVING A CENTRALLY LOCATED PROCESSING SOLUTION DELIVERY SYSTEM; U.S. Patent Application Serial No. 10/293,651 filed Nov. 13, 2002, entitled DUAL GROOVE PHOTOGRAPHIC PROCESSING DRUM and U.S. patent application Ser. No. 10/307,911 filed Dec. 2, 2002, entitled A PHOTOGRAPHIC PROCESSING DRUM HAVING A CIRCULAR DRYING CYLINDER.

FIELD OF THE INVENTION

The present invention is directed to a photographic processing drum having a circular media holding or cueing cylinder and a linear dryer located at an exit of the circular cylinder.

BACKGROUND OF THE INVENTION

Photographic processors come in a variety of shapes and sizes from large wholesale photographic processors to small micro-labs. As photographic processors become more and more technologically sophisticated, there is a continued need to make the photographic processor as user-friendly and as maintenance-free as possible.

Currently available photographic processors have one or more of the following shortcomings: (1) the film processing time is relatively long; (2) some photographic processors, because of their size, require a large amount of space to accommodate both the processor and the dryer; (3) some photographic processors may require an unacceptable amount of processing solution due to the design of the processing tank; (4) some photographic processors generate an unacceptable amount of solution waste due to the design of the processing tank.

What is needed in the art is a photographic processor which provides exceptional print quality while requiring a minimal number of tasks necessary for an operator to process multiple types of film. What is further needed is a photographic processor which is designed to accommodate a processing section, a dryer and a cueing or holding space for film to be dried in a compact arrangement which takes up a minimum amount of space while at the same time increasing throughput.

SUMMARY OF THE INVENTION

The present invention addresses some of the difficulties and problems discussed above by the discovery of a photographic processor having an drum processor and a circular holding or cueing cylinder which surrounds the drum processor and holds processed film prior to delivery to a linear dryer. The arrangement of the present invention increases throughput by moving media as quickly as possible from the drum processor to permit an entry of subsequent media into the drum processor.

The present invention accordingly relates to a photographic processor which comprises a circular processing drum for processing photographic media; a circular holding cylinder having a circular media path therein, with the circular holding cylinder being adapted to receive the processed photographic media from the circular processing drum and hold the processed photographic media therein prior to drying; and a film dryer provided at an outlet of the circular holding cylinder for drying the processed photographic media as the photographic media exits the circular holding cylinder.

The present invention further relates to a method of processing photographic media which comprises the steps of inserting photographic media into a circular processing drum; supplying and discharging prosing solution into and from the circular processing drum to process the photographic media; transferring the processed photographic media from the circular processing drum to a circular holding cylinder which is adapted to hold the processed photographic media therein prior to drying; and transferring the processed photographic media from the circular holding cylinder to a dryer positioned at an outlet of the circular holding cylinder to dry the processed photographic media as the photographic media is removed from the circular holding cylinder.

These and other features and advantages of the present invention will become apparent after a review of the following detailed description of the disclosed embodiments and the appended claims.

BRIEF DESCRIPTION OF THE DRAWINGS

The present invention is further described with reference to the appended figures, wherein.

DETAILED DESCRIPTION OF THE INVENTION

Figure 1:
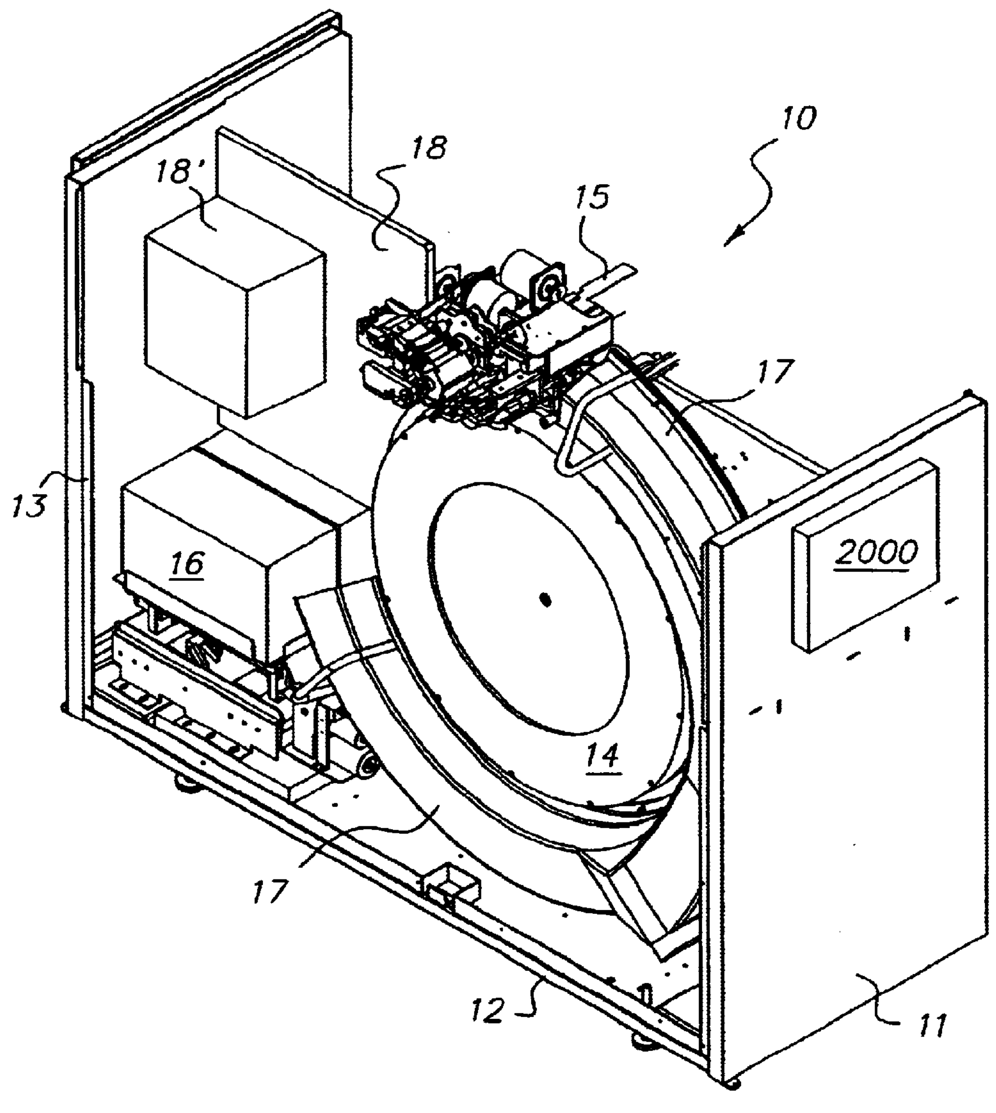
FIG. 1 is a frontal view of an exemplary photographic processor of the present invention.

An exemplary photographic processor is shown in FIG. 1. Photographic processor 10 comprises at least an outer housing which includes a first side wall 11, a base housing member 12, and a second side wall 13. Photographic processor 10 includes a circular processing chamber or drum 14 (also referred to herein as the "circular processing drum 14"), which may be used to expose a given strip or roll of film to one or more photoprocessing chemicals. Photographic processor 10 further includes a film-loading/unloading device 15 positioned above and cooperating with circular processing drum 14. A chemical delivery system 16 is positioned for easy access by a user (i.e., for maintenance or replacement purposes) at a location near side wall 13 and base housing member 12. Photographic processor 10 also includes a circular dryer 17 in the form of, for example, a cylinder, for drying the processed film. Dryer 17 is concentrically and co-axially positioned around processing drum 14. Once a given strip or roll of film dried in dryer 17, the film proceeds to a scanner 18', which may be positioned above chemical delivery system 16 in a space bordered by side wall 13 and left interior wall 18 or any other convenient location.

Figure 2:
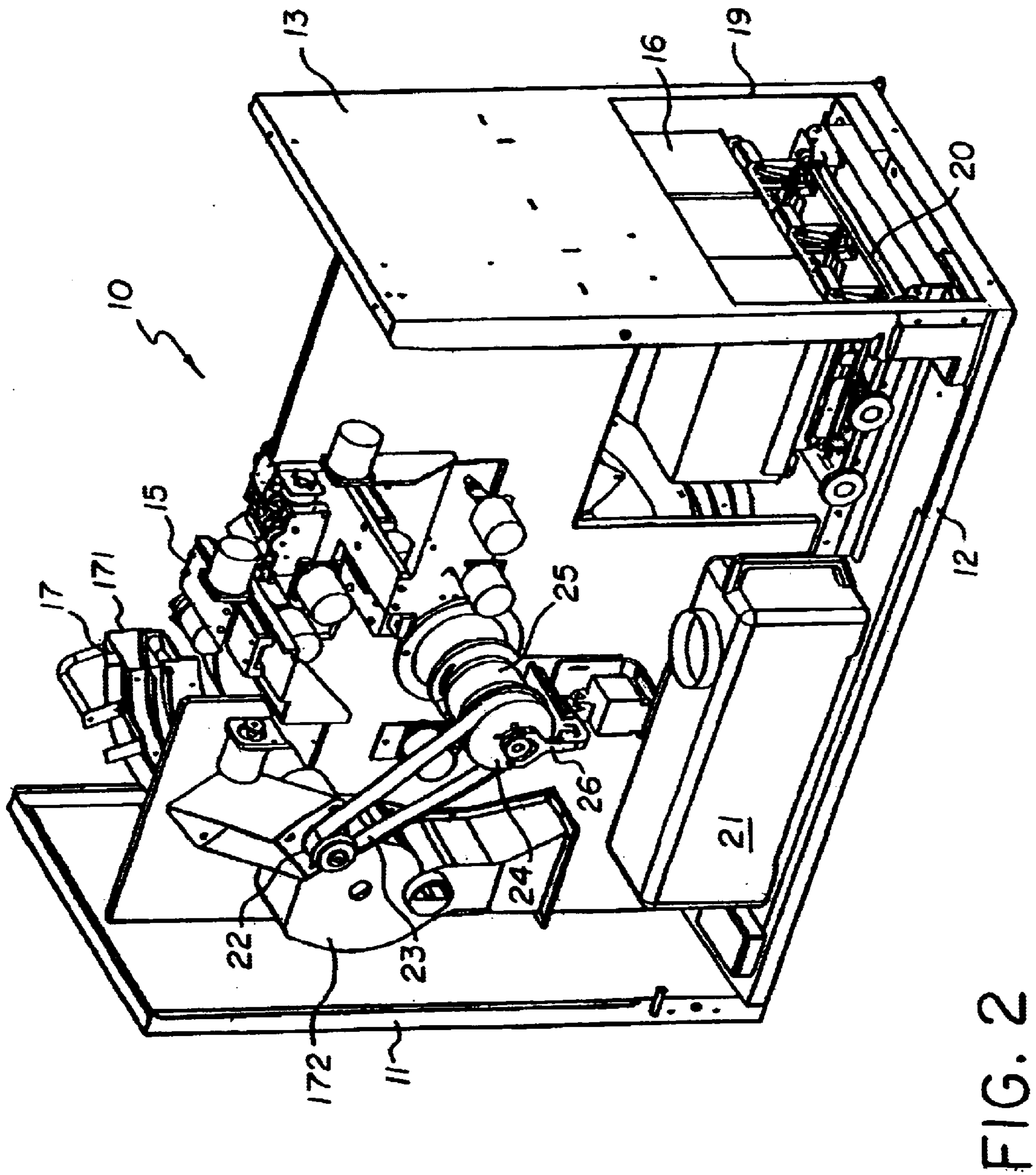
FIG. 2 is a rear view of an exemplary photographic processor of the present invention.

FIG. 2 depicts a rear view of photographic processor 10. As shown in FIG. 2, photographic processor 10 includes opening 19 in side wall 13 for accessing chemical delivery system 16. Sliding track mechanism 20 allows an operator to pull at least a portion of chemical delivery system 16 through opening 19 to an exterior location outside of photographic processor 10. Such an assembly allows for quick and easy maintenance and replacement of chemical delivery system 16. Photographic processor 10 can include a waste collection reservoir 21, which collects and stores used processing chemicals removed from circular processing drum 14 following development of a given strip or roll of film. As shown in FIG. 2, dryer 17 includes dryer entrance 171 and dryer blower 172. The various components of photographic processor 10 will be described in more detail below with reference to FIGS. 3–21.

Figure 3:
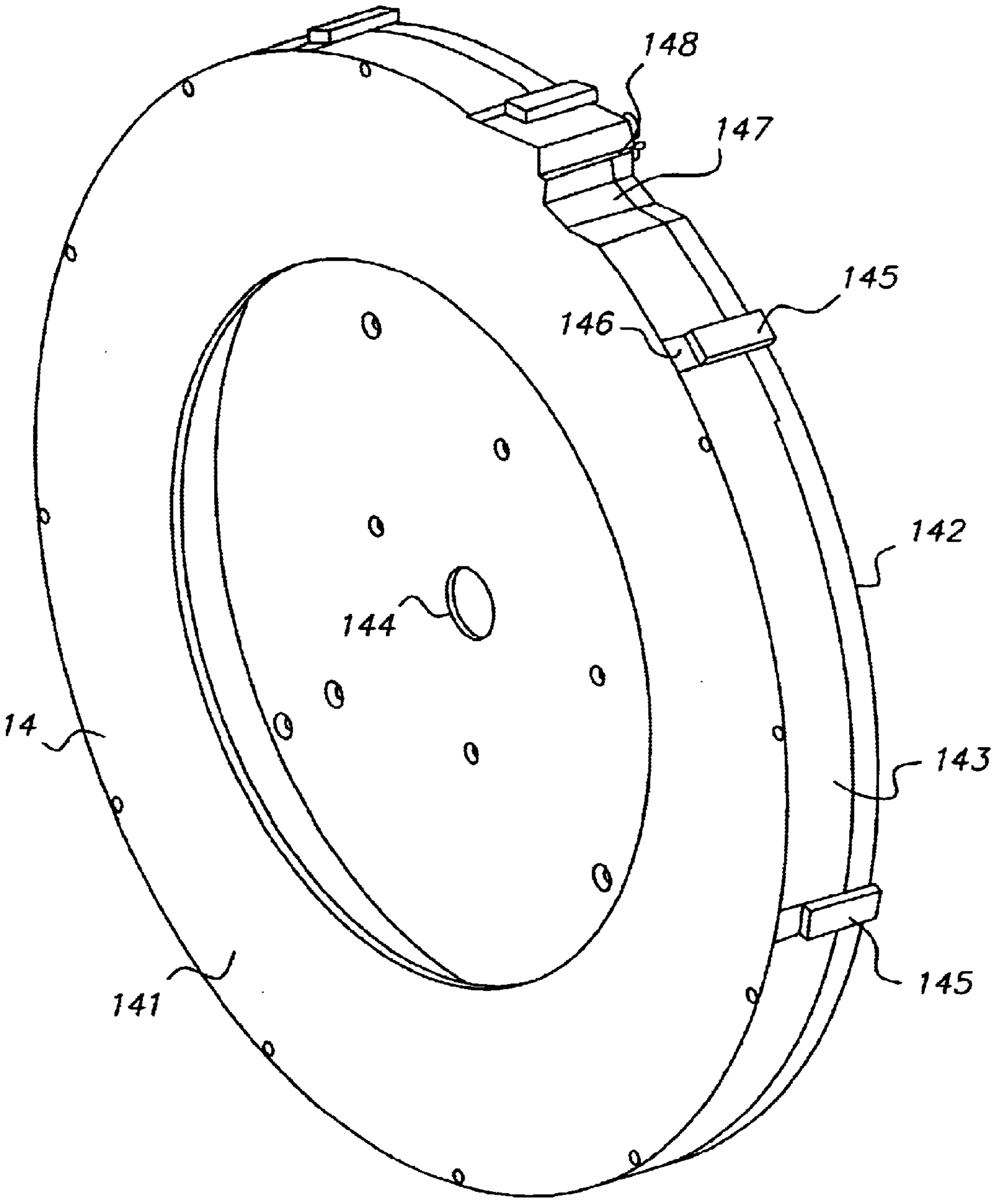
FIG. 3 depicts an exemplary circular processing drum used in the photographic processor of the present invention.

Circular processing drum 14 is further described in FIG. 3. As shown in FIG. 3, circular processing drum 14 includes a first or front wall 141, a second or back wall 142, a side wall 143, and a central axis opening 144. A portion of a drum and disk drive mechanism 25 (shown in FIGS. 2, 8 and 9) passes through central access opening 144. Circular processing drum 14 comprises two circular sections joined together at multiple locations around the perimeter of circular processing drum 14 via male clasping members 145 and female clasping members 146. It should be noted that any means for attaching the two circular components of circular processing drum 14 may be used in place of male clasping members 145 and female clasping members 146. Further, it should be noted that circular processing drum 14 may also be in the form of a single component as oppose to two circular components as shown in FIG. 3, although such a design may add manufacturing cost to circular processing drum 14.

Circular processing drum 14 further comprises a film cartridge loading area 147 on an outer surface of side wall 143 for loading film directly from a film cartridge into circular processing drum 14, such as with APS film. Circular processing drum 14 also comprises a film input slot 148, which enables the entry and exit of film into circular processing drum 14.

Figure 4:
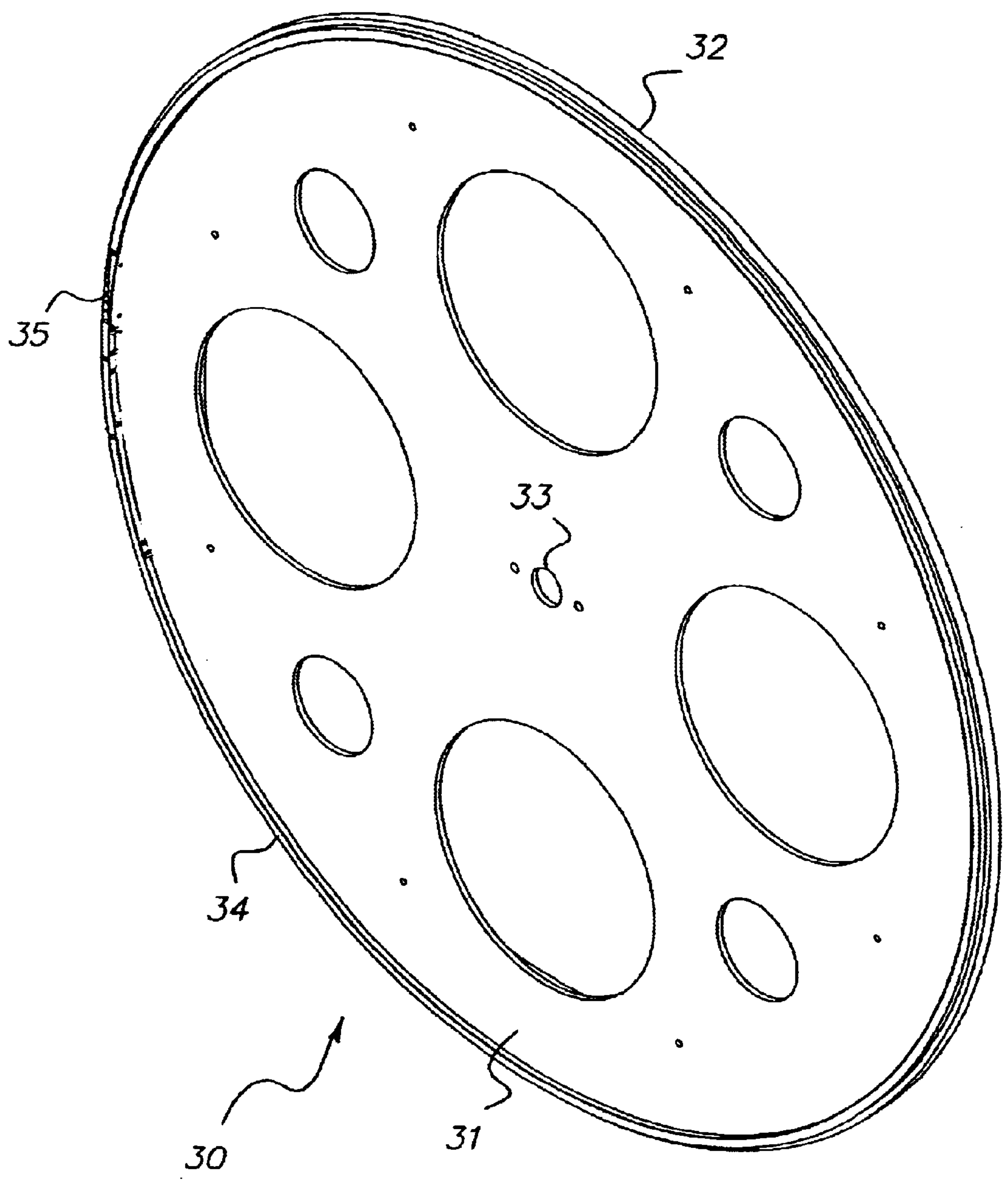
FIG. 4 depicts an exemplary disk located within the circular processing drum of the present invention.
Figure 5:
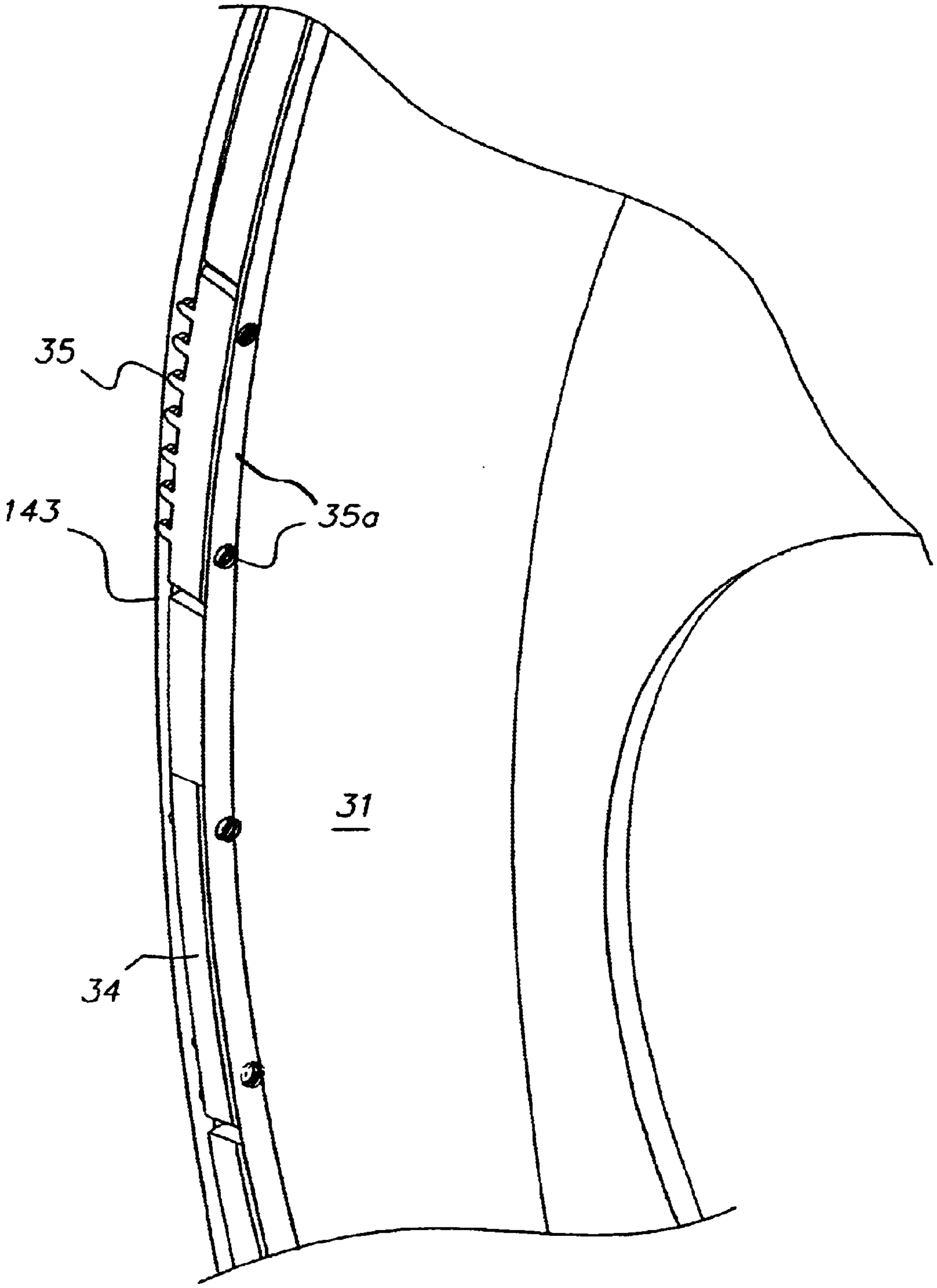
FIG. 5 displays a close-up view of an exemplary disk having an outer perimeter and one or more sets of disk teeth.
Figure 6:
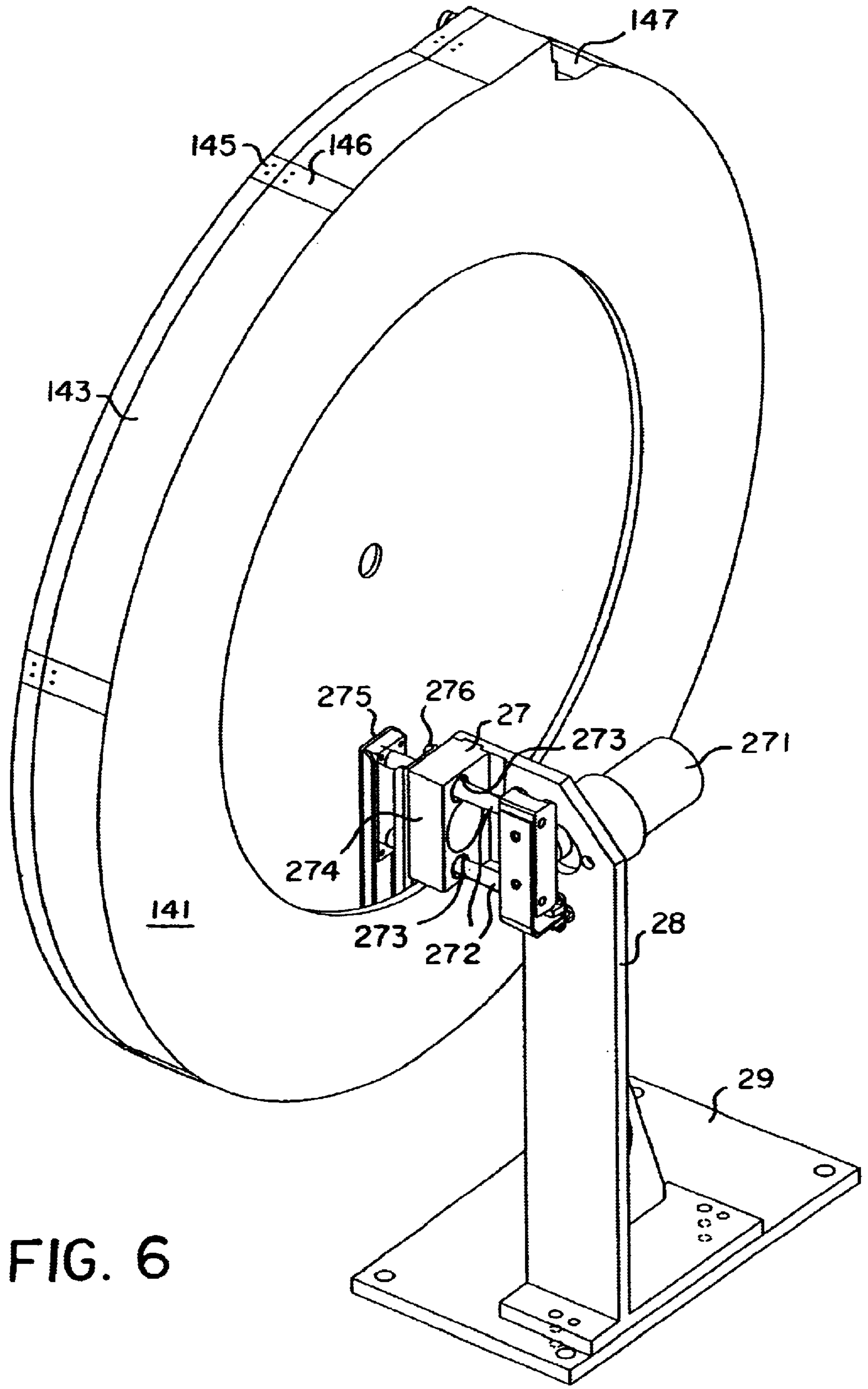
FIG. 6 depicts an exemplary roller mechanism positioned within the circular processing drum.

FIG. 4 depicts an exemplary disk 30, which is positioned within circular processing drum 14, and functions to convey film within circular processing drum 14 once the film enters through film input slot 148. Disk 30 includes a first face 31, a second face 32, a central access opening 33, an outer perimeter 34, and one or more sets of disk teeth 35 located along outer perimeter 34 of disk 30. As with circular processing drum 14, a portion of drum and disk drive mechanism 25 may extend into central access opening 33 to engage with and cause rotation of disk 30. FIG. 5 provides a close-up view of a portion of disk 30, and in particular, outer perimeter 34 and a set of disk teeth 35 on the outer perimeter 34 of disk 30. The outermost points of disk teeth 35 are in close proximity to an inner surface of side wall 143 of circular processing drum 14. In a feature of the invention, disk teeth 35 could be spring loaded through the use of spring arrangement 35*a*.

Figure 7A:
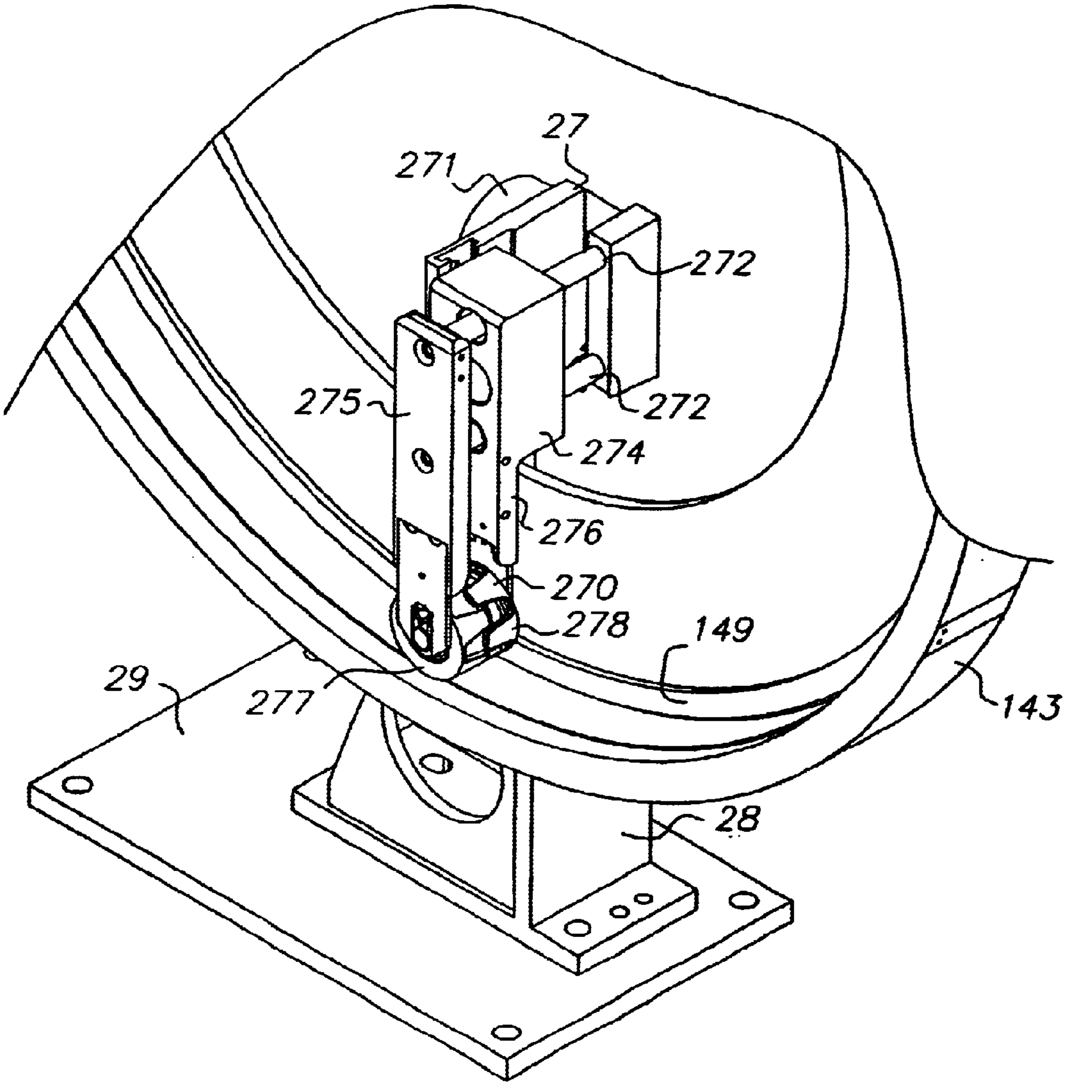
FIGS. 7A–7H depict views of the exemplary roller mechanism of FIG. 6 and illustrate example methods of moving the roller mechanism.

An agitating roller arrangement 27 (FIGS. 6 and 7A) is positioned within circular processing drum 14. Roller arrangement 27 includes an agitating roller 270 having inter engaging members 277 and 278 (FIG. 7A). Roller arrangement 27 may be supported by a support member 28, which is attached to a support member base 29. Support member base 29 may be permanently or temporarily attached to base housing member 12 (shown in FIGS. 1 and 2). Agitating roller arrangement 27 includes a motor 271, which provides motion to pistons 272 through openings 273 in a fixed positioning member 274. Pistons 272 proceed through stationary positioning support member 276 and are attached to movable positioning support member 275. As pistons 272 move, movable positioning support member 275 which is coupled to member 277 separates film stationary positioning support member 276 which is coupled to member 278. This permits roller 270 to be expandable between a first width when the members 277 and 278 overlap each other and a second width larger them the first width (FIG. 7A) when the members 277 and 278 move away from each other.

FIG. 7A provides a detailed view of roller arrangement 27 and its various components. As shown in FIG. 7A, movable positioning support member 275 and stationary positioning support member 276 connect to interengaging members 277 and 278 respectively as described above. During use, the film passes between roller 270 and an interior surface of drum 14. Roller 270 is freely rotatable and maintains film flat along the lower portion of drum 14. As will be described later, roller 270 further provides an agitating feature within processing drum 14 during processing. Additionally, the width of roller 270 is adjustable as described above to accommodate a shorter width film (i.e. APS film) and a larger width film (i.e. 35 mm film). Further, roller arrangement 27 including roller 270 can be vertically adjustable to accommodate for film curl as the film passes between roller 270 and the interior surface of drum 14. As a still further option, roller 270 can be spring loaded so as to accommodate any variation in the interior surface of drum 14.

Figure 7B:
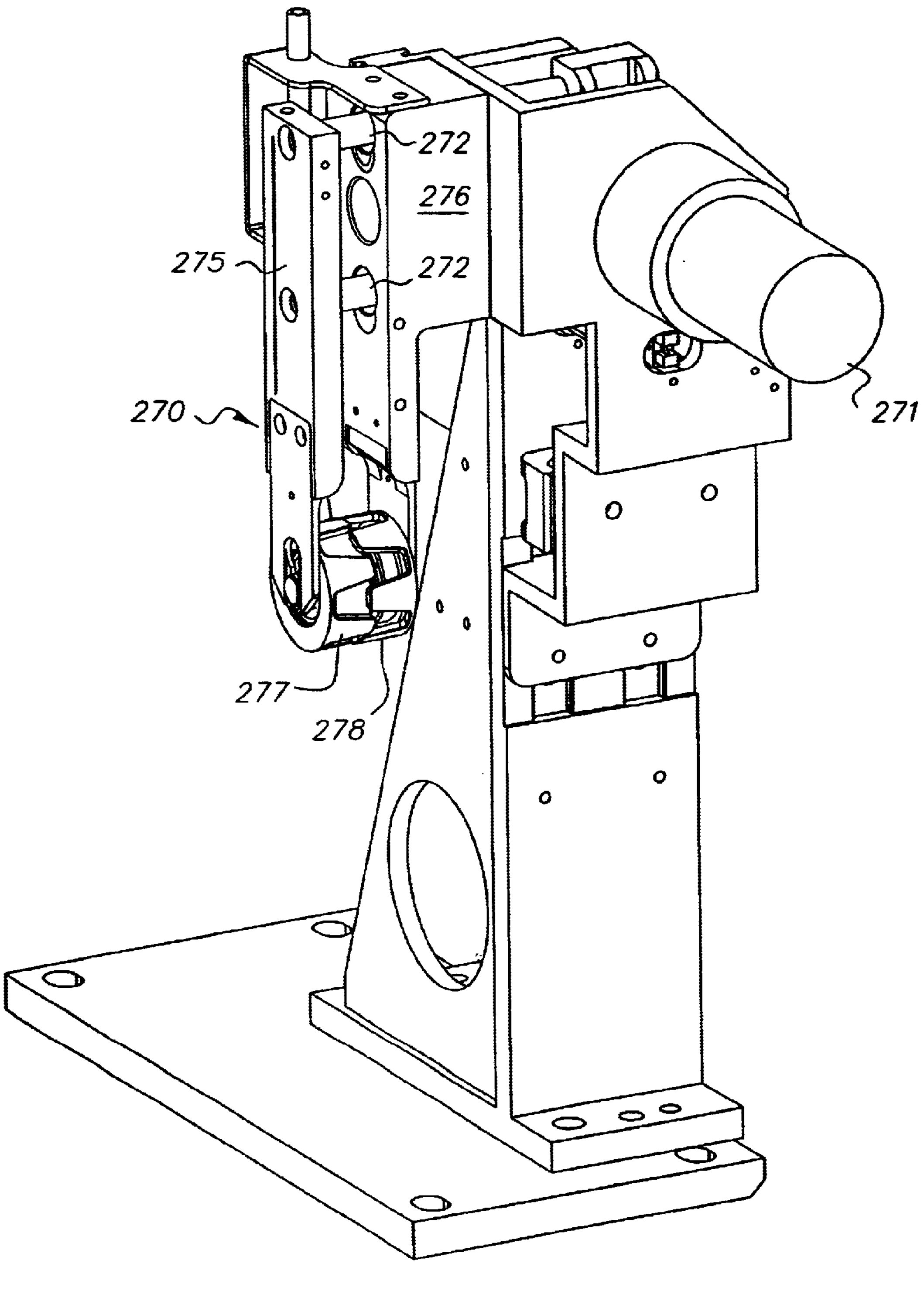
Figure 7C:
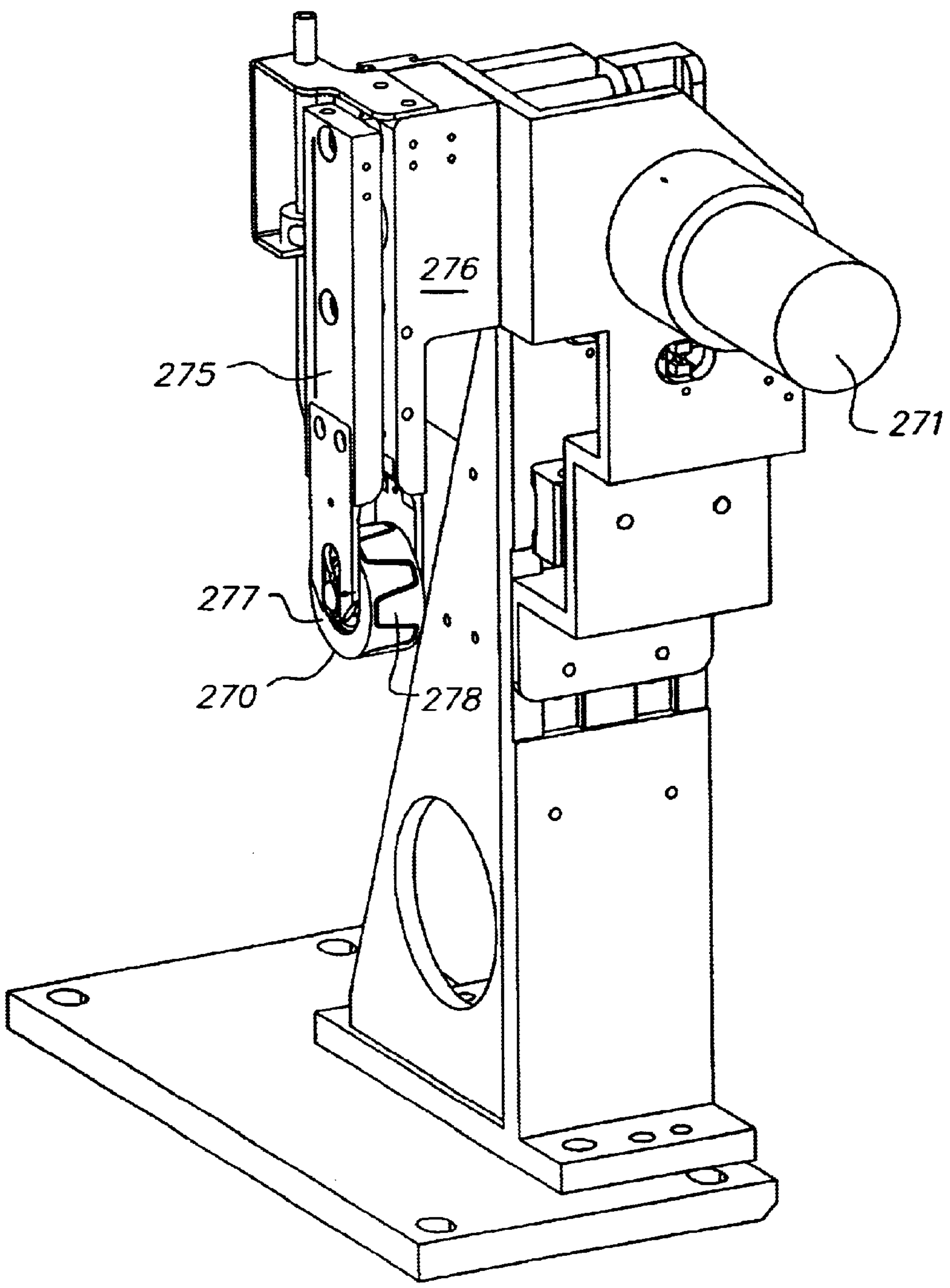

With reference to FIG. 7B as described above, motor 271 is adapted to provide motion to pistons or shafts 272 which move member 275 with respect to or relative to member 276. This provides corresponding movement to roller members 277,278 to permit roller 270 to be expandable between a first width when members 277 and 278 overlap each other by a first amount as shown in FIG. 7C, and a second width larger than the first width, when members 277 and 278 move away from each other so as to overlap each other by a second amount less than the first amount or not at all as shown in FIG. 7B. The mechanism for placing roller 270 between the larger width state and the shorter width state could be any one of a variety of movement mechanisms such as gears, cams, belts, pneumatics or a combination thereof.

Figure 7D:
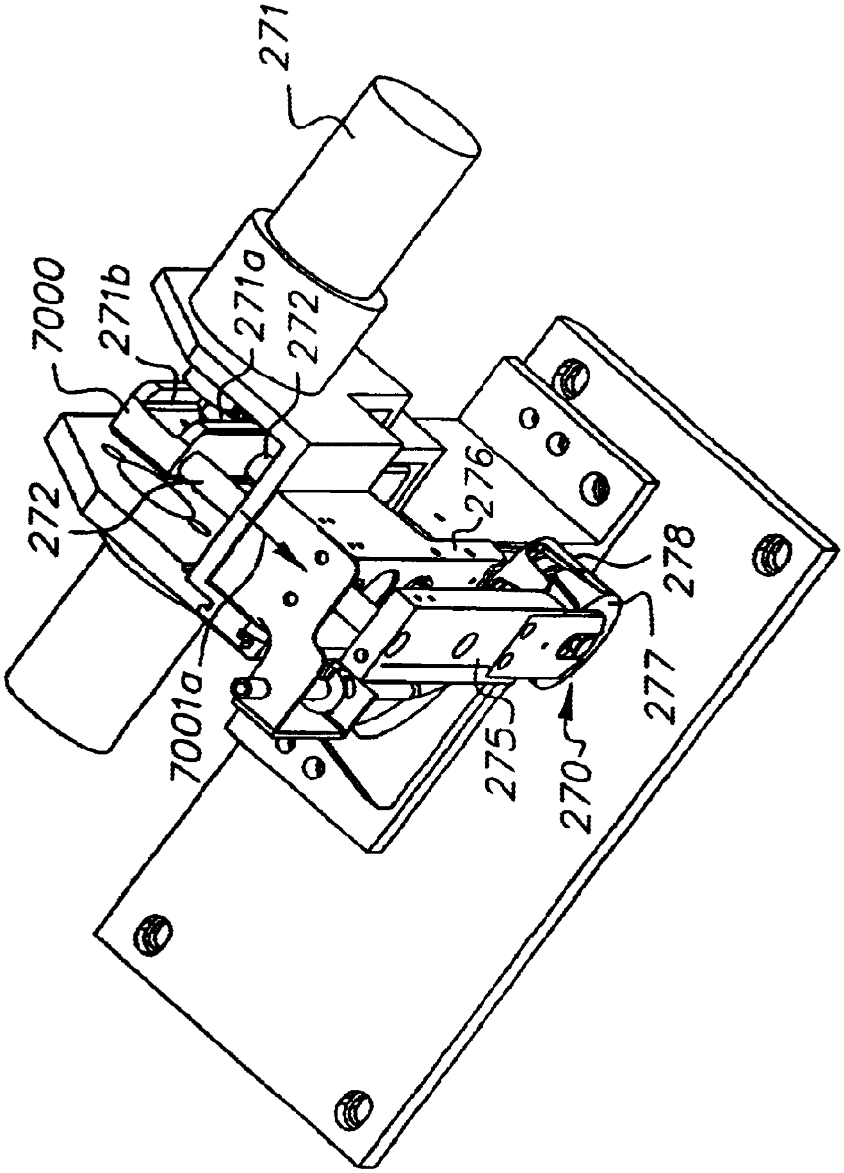
Figure 7E:
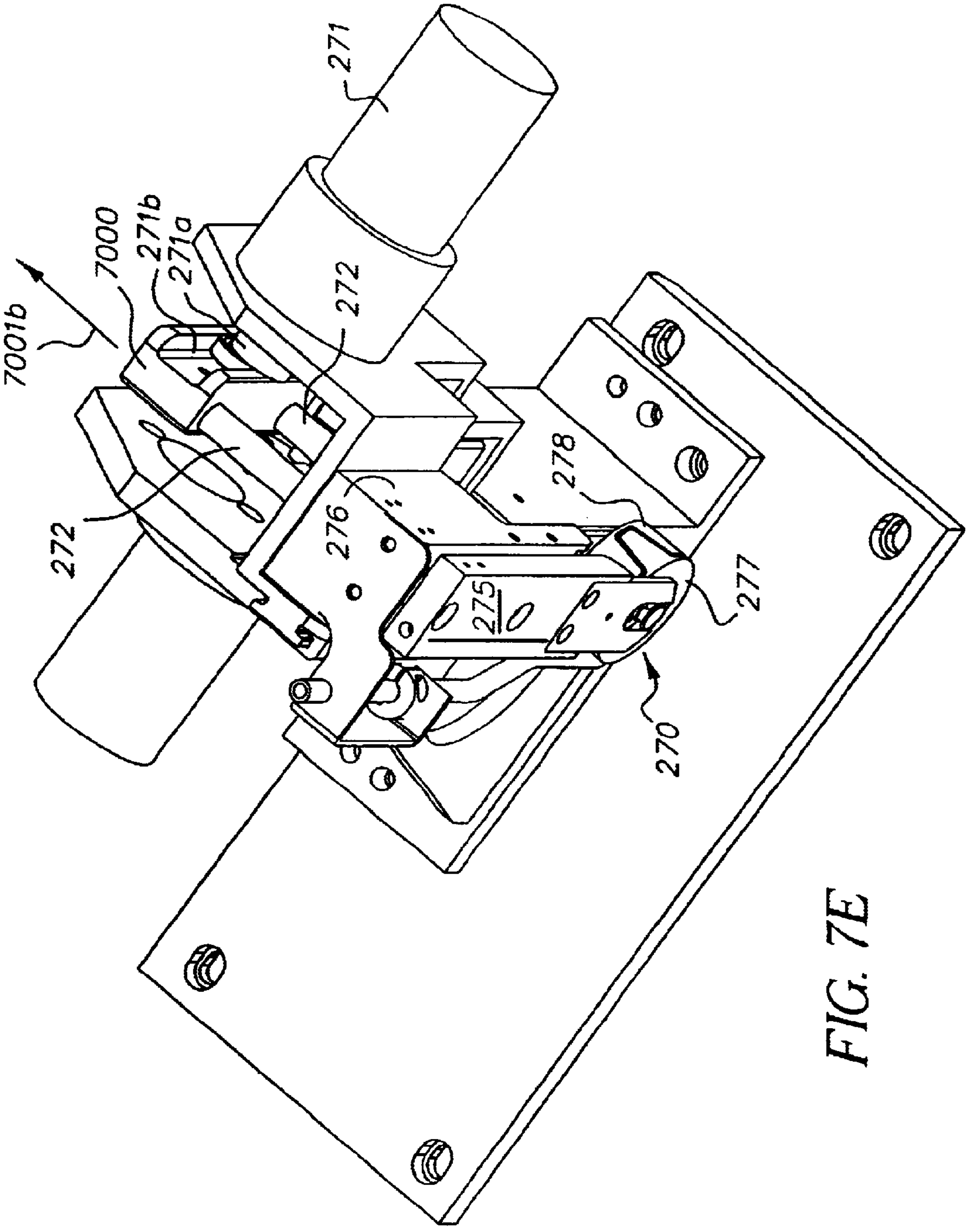

An example of a mechanism for placing roller 270 between the larger width state and the shorter width state is illustrated in FIGS. 7D and 7E. As shown in these drawings, motor 271 could be attached to an eccentrically mounted cam 271*a* which rotates about a center axis of motor 271 actuation of motor 271. Cam 271*a* is fitted within an opening 271*b* of a plate member 7000. Plate member 7000 is attached to at least pistons 272. Therefore, upon actuation of motor 271, cam 271*a* is moved so as to be located at a first position illustrated in FIG. 7D. This movement of cam 271*a* causes plate member 7000 to be moved in direction 7001*a*. Movement of plate member 7000 in direction 7001*a* causes a corresponding movement of pistons 272 in the same direction. This movement of pistons 272 causes member 275 to move away from member 276, which causes roller member 277 to move a corresponding amount relative to roller member 278 to provide for the wide width state of roller 270 as shown in FIGS. 7B and 7D.

When it is desired to place roller 270 in the shorter width state, motor 271 is actuated to rotate or locate cam 271*a* in the position shown in FIG. 7E. This causes a movement of plate member 7000 in an opposite direction (direction 7001*b*). Movement of plate member 7000 in direction 7001*b* causes a corresponding movement of pistons 272 in the same direction. This movement of pistons 272 causes a movement of member 275 in a direction toward member 276 which results in the movement of roller member 277 toward roller member 278 to provide for the shorter width state shown in FIGS. 7C and 7E.

The above description with respect to FIGS. 7D and 7E is only one example for moving roller members 277 and 278 to achieve the shorter and longer width states. It is realized that numerous types of moving mechanisms can be utilized to achieve the noted movement, and therefore, the present invention is not limited to the example shown. For example, motor 271 can drive pistons 272 via a gear drive, a screw gear, a belt drive, a pneumatic drive or a combination thereof.

Figure 7F:
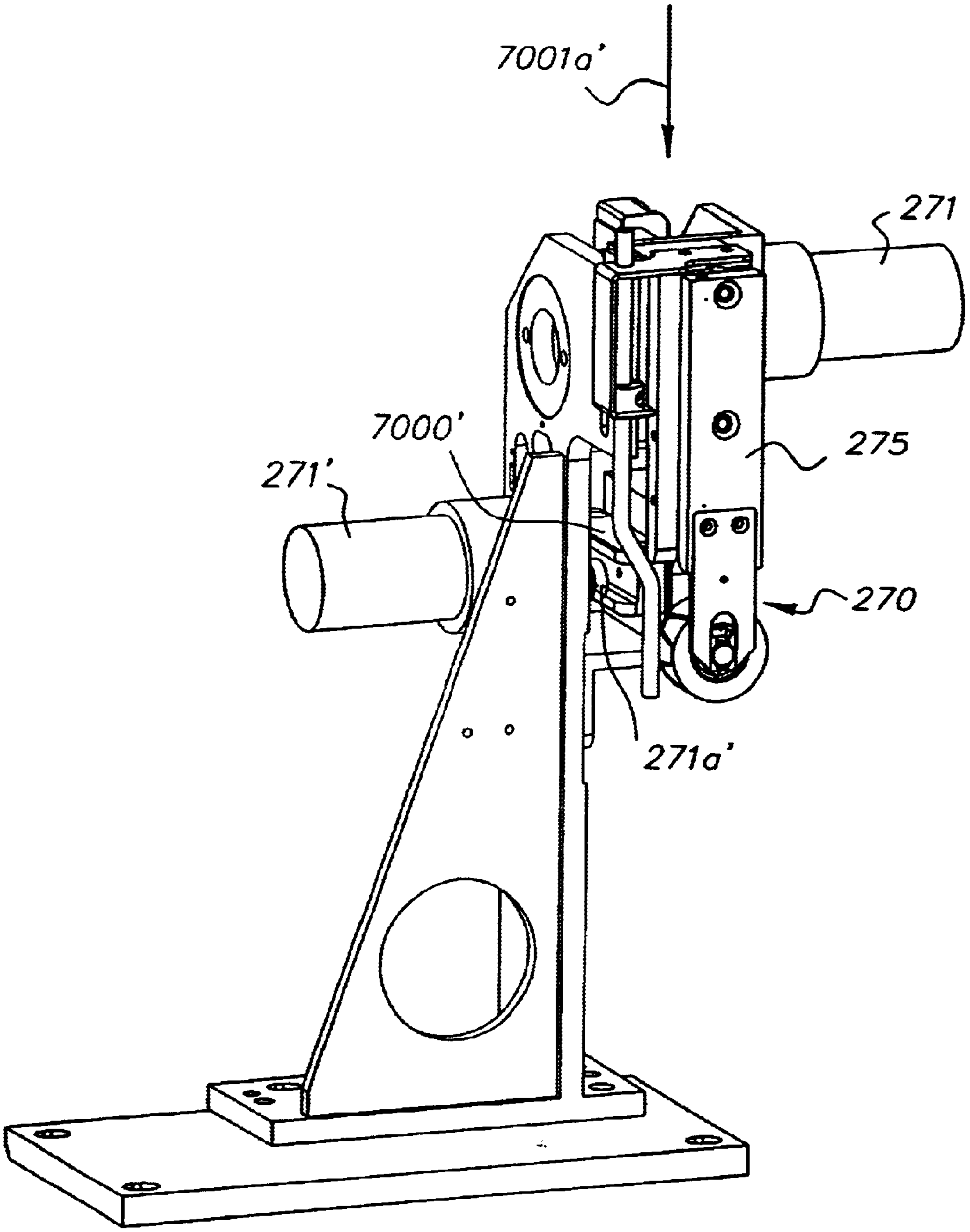
Figure 7G:
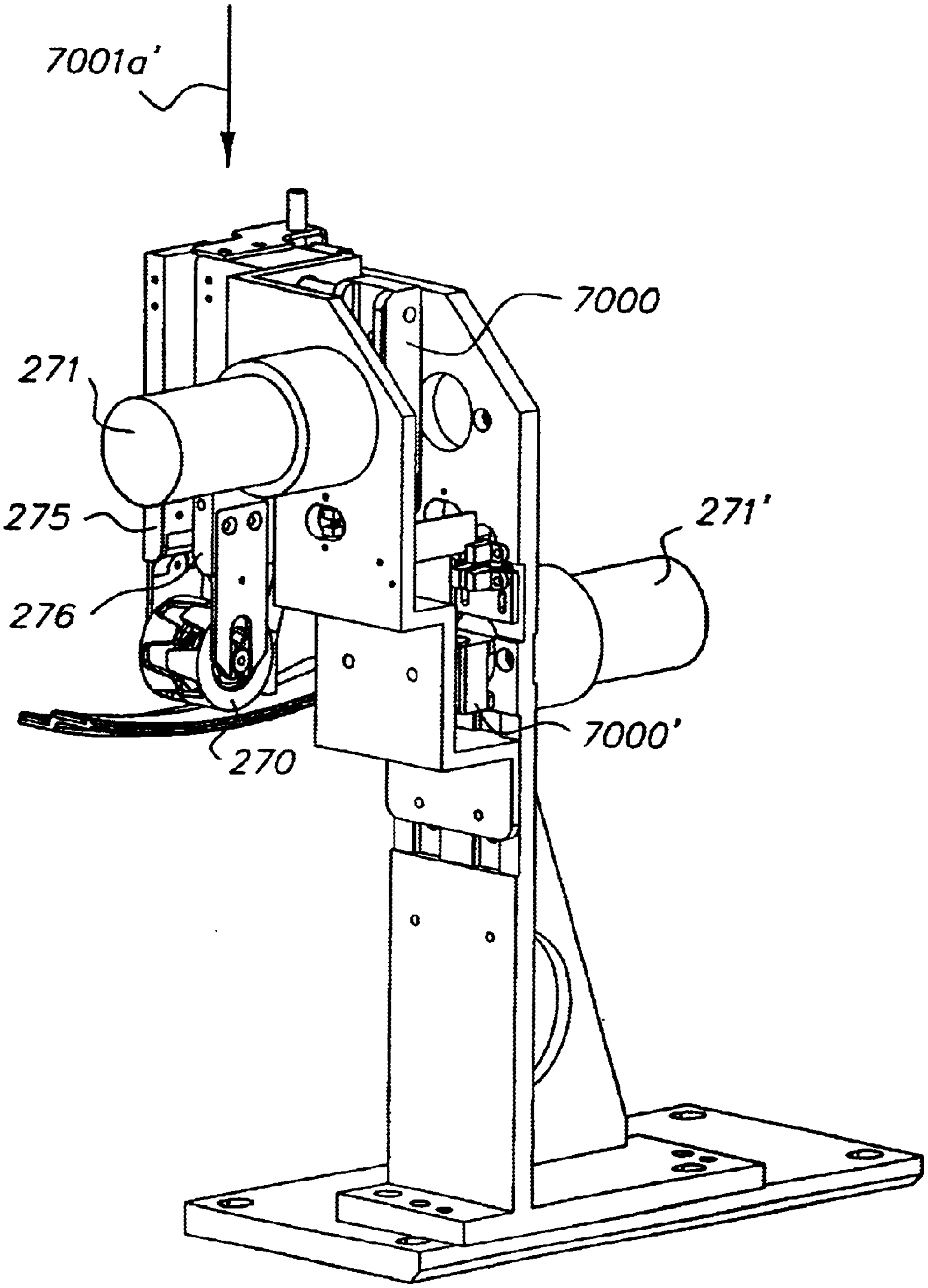
Figure 7H:
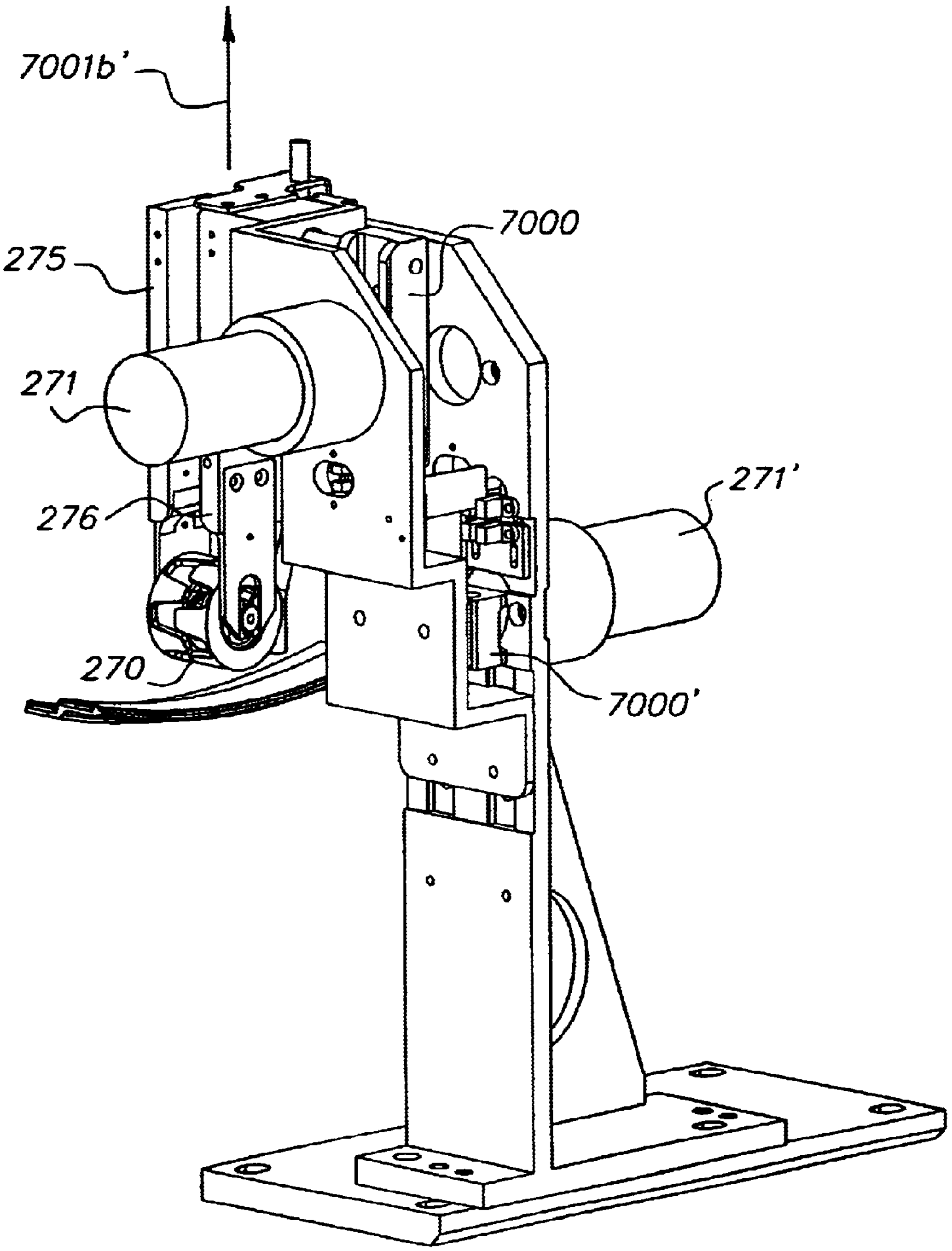

Further, as also shown in FIGS. 7F, 7G and 7H, roller 270 can be adapted to be moved up and down in response to, for example, the actuation of a motor to accommodate different films and different locations of the processing paths within the drum. The mechanism for moving roller 270 in a vertical direction could be any one of a variety of movement mechanism such as gears, cams, belts, pneumatics or a combination thereof.

FIGS. 7F, 7G and 7H illustrate one example for moving roller 270 vertically or up and down. As shown in FIG. 7F, a further motor 271' is attached to an eccentrically mounted cam 271*a'* which is adapted to rotate about a center axis of motor 271' upon rotation of motor 271'. Cam 271*a'* is fitted within a plate member 7000' in a manner similar to the arrangement of FIGS. 7D and 7E. Plate 7000' is attached to at least member 276 which is attached to member 275. As previously described, members 275 and 276 are respectively attached to roller members 277 and 278. Therefore, upon actuation of motor 271', cam 271*a* is located at a first position illustrated in FIG. 7F and FIG. 7G. This movement of cam 271*a'* causes plate member 7000' to move in direction 7001*a'* which causes a corresponding movement of members 276 and 275 and therefore roller 270 in direction 7001*a'*. This provides for the placement of roller 270 in the lower position as shown in FIG. 7F and FIG. 7G.

When it is desired to place roller 270 in an upper position, motor 271' is rotated to place cam 271*a'* in a second position The movement of cam 271*a'* causes a movement of plate member 7000' in an opposite direction (direction 7001*b'*) as shown in FIG. 7H. Movement of plate member 7000' in direction 7001*b'* causes a corresponding movement of members 275, 276 and therefore roller 270 in direction 7001*b'* to the position illustrated in FIG. 7H. This provides for the upper position of roller 270.

The above description with respect to FIGS. 7F, 7G and 7H is only one example for moving roller 270 up and down. It is realized that numerous types of moving mechanisms can be utilized to achieve the noted movements and therefore, the preset invention is not limited to the example shown. For example, motor 271' can drive roller 270 via a gear drive, a screw gear, a belt drive, a pneumatic drive or a combination thereof.

Further, the above movements of roller 270 between a shorter width state and a longer width state and between the upper position and the lower piston, can be achieved through the use of a single motor. That is, a single motor can be interengaged with a drive that places roller 270 in the shorter or longer width states while moving roller 270 to the upper or lower positions.

Figure 8:
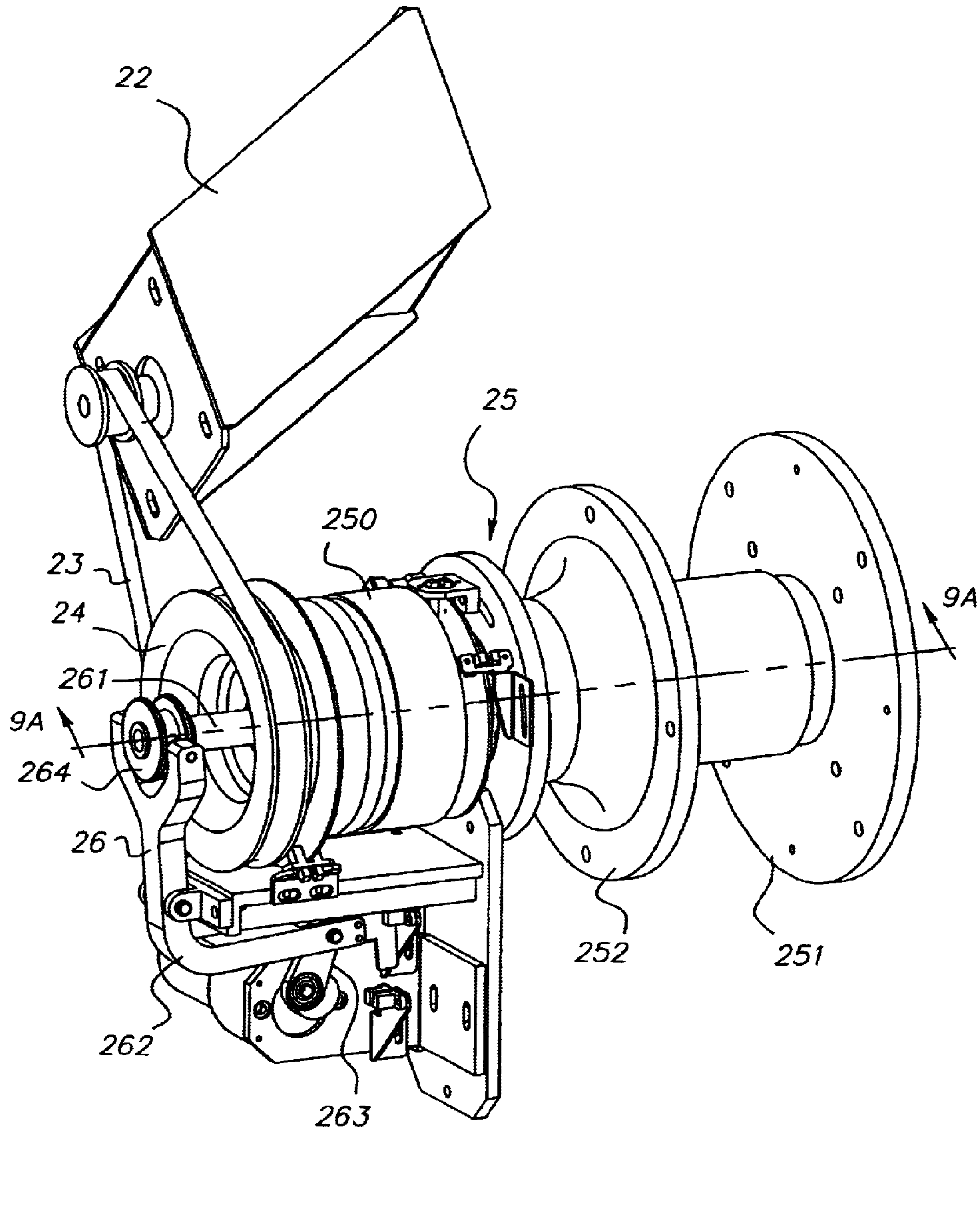
FIG. 8 depicts an exemplary drum and disk drive mechanism for rotating a circular processing drum, and a clutch mechanism for selectively engaging the drum and disk.
Figure 9A:
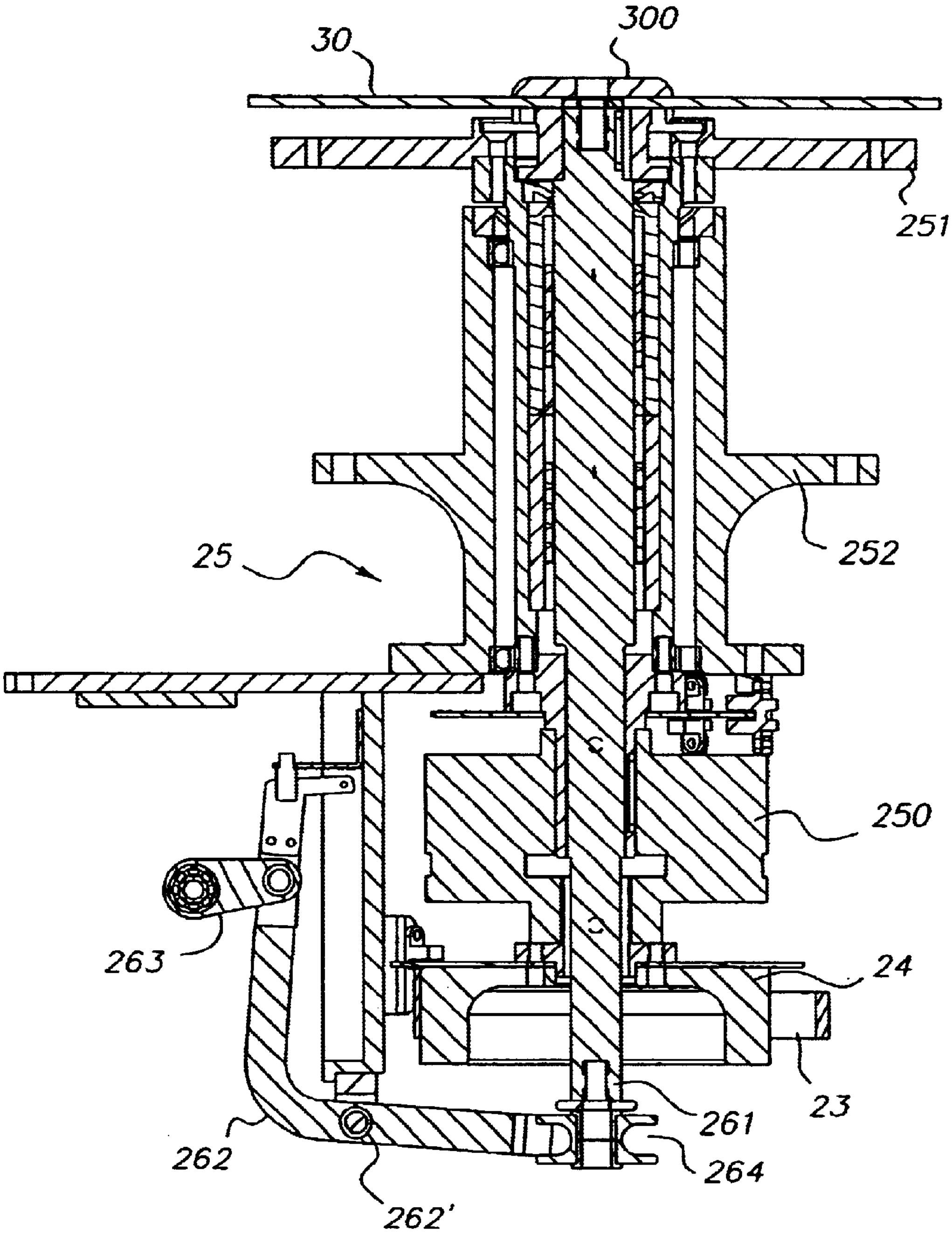
FIG. 9A displays a cross-sectional view of the drum and disk drive mechanism along line A—A in FIG. 8.

Circular processing drum 14 is connected to a drum and disk drive mechanism 25, which selectively rotates disk 30 relative to drum 14 to position and convey the film along and within processing drum 14, and rotates both disk 30 and drum 14 together during a processing and/or cleaning cycle. Circular processing drum 14 rotates about an axis of symmetry. An exemplary drum and disk drive mechanism 25 is shown in FIG. 8. Drum and disk drive mechanism 25 cooperates with a motor 22, a belt 23, and a pulley 24 as shown in FIGS. 8 and 9A. Drum and disk drive mechanism 25 includes a drive shaft 261 which is operationally connected to pulley 24. Also shown in FIGS. 8 and 9A are flanges 251 and 252. Flange 251 is connected to drum 14 while an end cap 300 holds disk 30 for rotation about drive shaft 261 (FIG. 9A). Actuation of motor 22 drives belt 23 which in turn drives pulley 24. This in tun causes a rotation of drive shaft 261 which rotates disk 30. Clutch mechanism 250 enables the engagement and disengagement of flange 251 to provide selective rotation to circular processing drum 14.

Figure 9B:
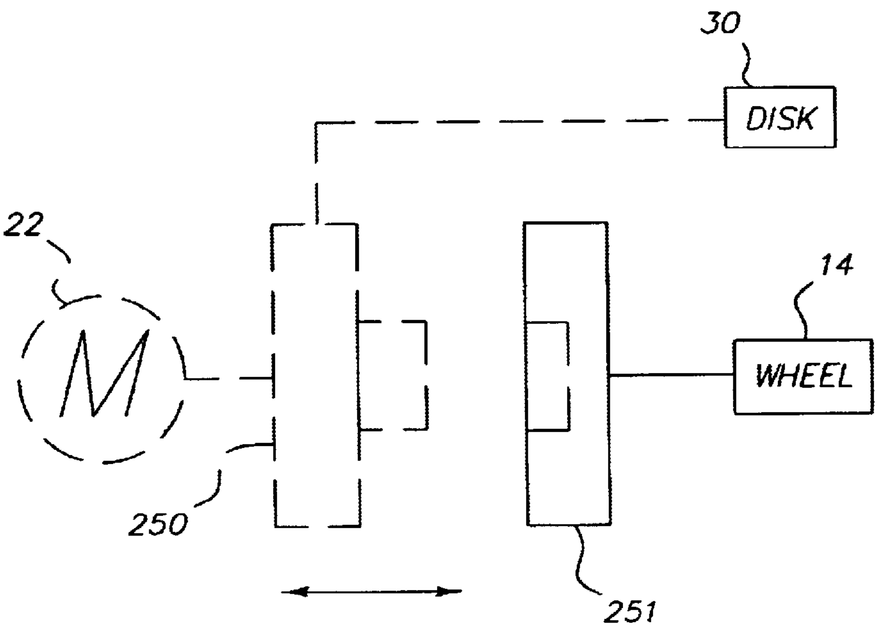
FIG. 9B schematically illustrates driving and clutching arrangement of the invention.

FIG. 9A displays a cross-sectional view of drum and disk drive mechanism 25 and clutch mechanism 250 along line 9A—9A in FIG. 8. With reference to FIG. 9A and FIG. 9B which is a schematic representation of the driving and clutching feature of the present invention, an operation will now be described. When loading film which will be described with reference to FIGS. 10 and 11, clutch 250 is deactivated as shown in FIG. 9B. In this state, rotation of motor 22 will cause a rotation of drive shaft 261 and accordingly, a rotation of disk 30 relative to drum 14. This is due to the fact that clutch 250 is deactivated and therefore, drum 14 is not rotated. This permits the conveyance of the film by rotation of disk 30 to a desired location within drum 14. After the film reaches the desired location within drum 14, clutch 250 is activated, (for example, clutch 250 is moved to the right in FIG. 9B) by actuating clutch 250 with flange 251 which is attached to drum 14. Therefore, a rotation of motor 22 will cause a rotation of both disk 30 and drum 14. This occurs during the processing stages to process the film in a manner which will be described later, and also during a cleaning stage.

Drive shaft 261 can be moved perpendicularly and through flange 251 and flange 252 to move disk 30 attached thereto. As shown in FIG. 9A, drive shaft 261 is attached to a fitting 264 in a manner which permits drive shaft 261 to rotate relative to fitting 264. Fitting 264 is in turn rotatably attached to a pivotable arm 262 and a movable member 263. Movable member 263 can be operationally connected to a motor for rotation of member 263. This causes arm 262 to pivot about point 262' to move drive shaft 261 to the left or right when viewing FIG. 9A from above the page. Movement of drive shaft 261 as noted above, moves disk 30 in a direction parallel to an axis of disk 30. This facilitates the accommodation of, for example, 35 mm and APS film on disk 30, since the disk 30 can be moved based on the typo of film being processed.

Figure 10:
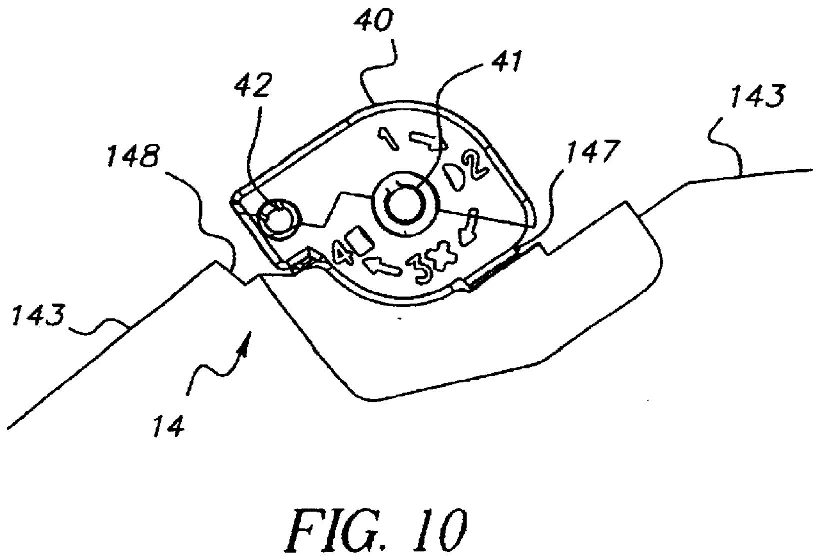
FIG. 10 depicts a film cartridge in a film-loading position using one film-loading method of the present invention.

Within the context of the present invention, a film may be loaded into circular processing drum 14 by a number of methods. One method of loading film, such as APS film, into circular processing drum 14 is shown in FIGS. 10–13. As shown in FIG. 10, film cartridge 40 comprising a film cartridge spool 41 and film cartridge door opening mechanism 52 is positioned in a film cartridge loading area 147 located on side wall 143 of circular processing drum 14. Film (not shown) exiting film cartridge 40 enters circular processing drum 14 at light tight film input slot 148 (FIG. 3) in side wall 143 of circular processing drum 14.

Figure 11:
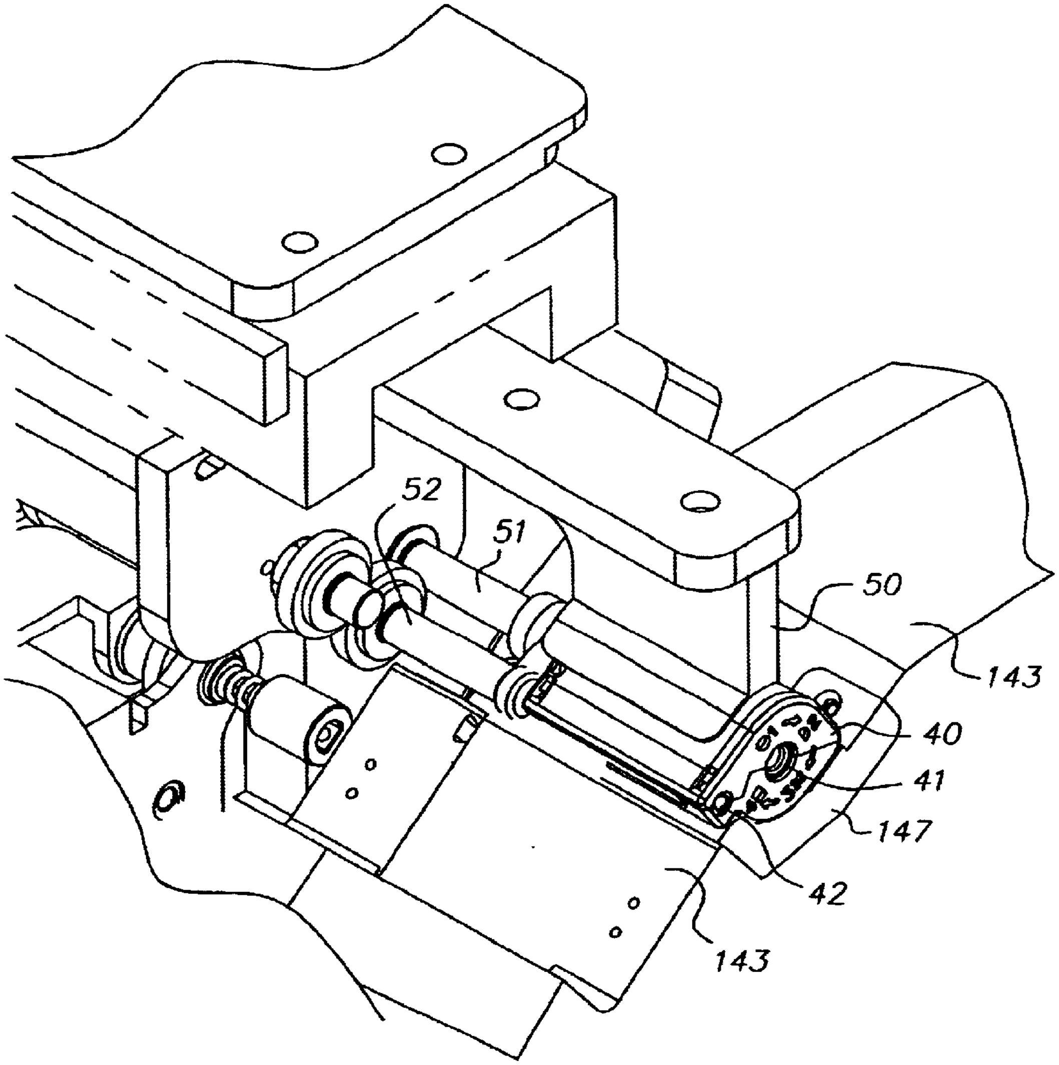
FIG. 11 depicts a film cartridge stabilizing step in one film-loading method of the present invention.

Once film cartridge 40 is positioned in film cartridge loading area 147, photographic processor 10 can initiate a number of film-loading and conveying steps, the results of which are shown in FIG. 11. It is noted that the film loading and conveying steps as well as other processing steps can be controlled by a computer or central processing unit (CPU) 2000 (FIG. 1) operationally associated with processor 10. In a first step, a film cartridge stabilizing member 50 applies an amount of pressure onto an upper surface of film cartridge 40 to prevent film cartridge 40 from moving while positioned in film cartridge loading area 147. Spool engaging member 51 and cartridge door opening mechanism engaging member 52 move toward film cartridge 40 and engage with film cartridge spool 41 and film cartridge door 42, respectively. Door opening mechanism engaging member 52 opens film cartridge mechanism 42 and spool engaging member 51 begins to rotate film cartridge spool 41, forcing film (not shown) out of film cartridge 40.

Figure 12:
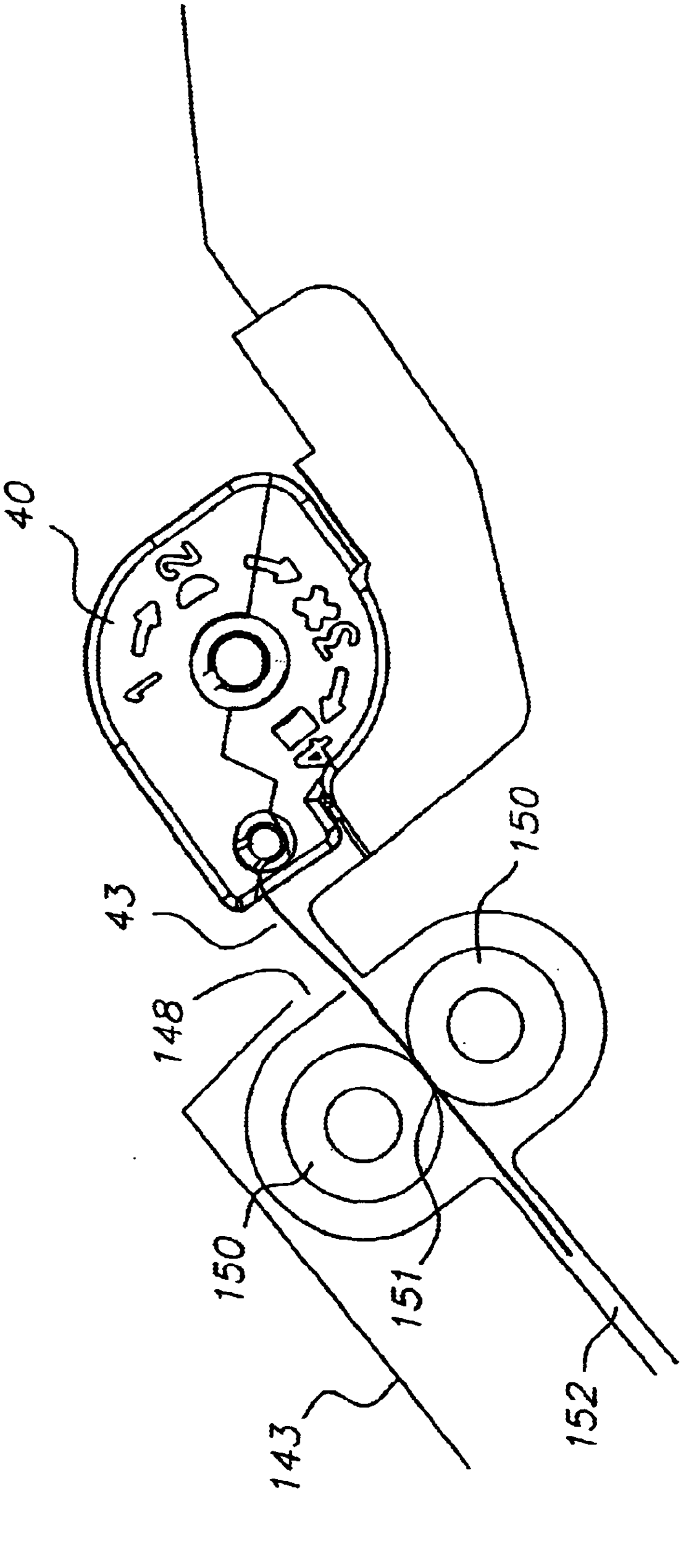
FIG. 12 depicts a film nipping step during a film-loading method of the present invention.
Figure 13:
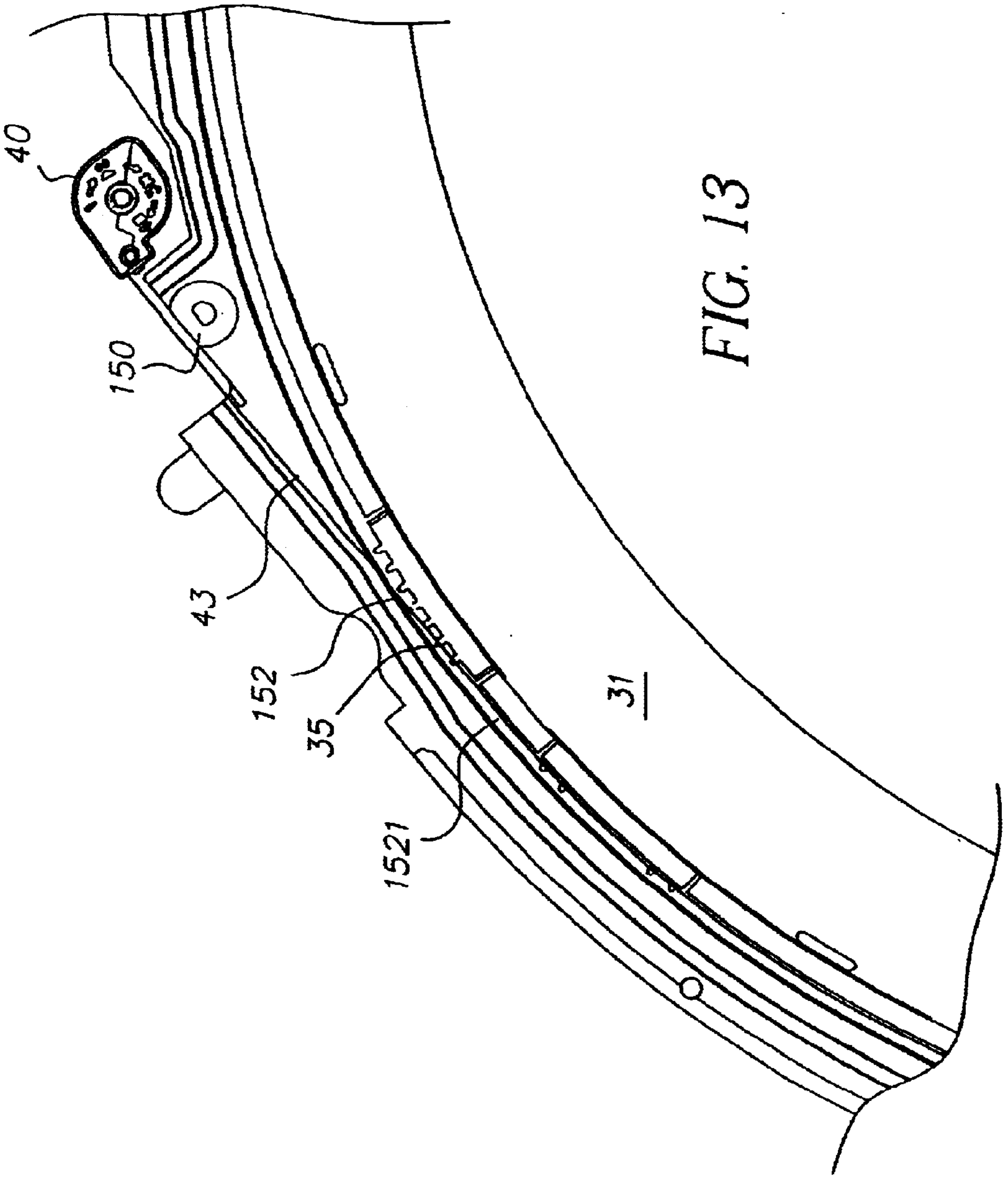
FIG. 13 depicts a cross-sectional view of film entering into a circular processing drum in one film-loading method of the present invention.

FIG. 12 shows a strip of film 43 exiting film cartridge 40 and entering film input slot 148 of circular processing drum 14. Driven nip rollers 150 gasp a leading edge of the strip of film 43 at drum roller nip point 151 and advance film 43 further into circular processing drum 14. As shown in FIG. 13, the strip of film 43 exits drum cavity slot 152 and enters into the drum processing cavity 1521 of circular processing drum 14, when in one or more sets of disk teeth 35 on disk 30 interengage with holes or perforations along an edge of the strip of film 43. As previously described, disk teeth 35 could be spring loaded so as to spring up at the appropriate time and inter engage with the holes or perforations along film 43. With clutch 250 disengaged, disk 30 and rollers 150 are rotated while circular processing drum 14 remains stationary. This causes film 43 to advance into the processing cavity 1521 of circular processing drum 14 a desired distance equal to the length of the strip or roll of film 43. As shown in FIGS. 10–13, in this film-loading method the film 43 remains intact with film cartridge 40.

A number of commercially available films may be loaded according to the film-loading method described above, namely, wherein the film remains intact with its corresponding film cartridge during processing. A suitable film, which may be used in this particular film-loading method, includes, but is not limited to, APS film Desirably, APS film is loaded into the photographic processor of the present invention according to this method.

Figure 14:
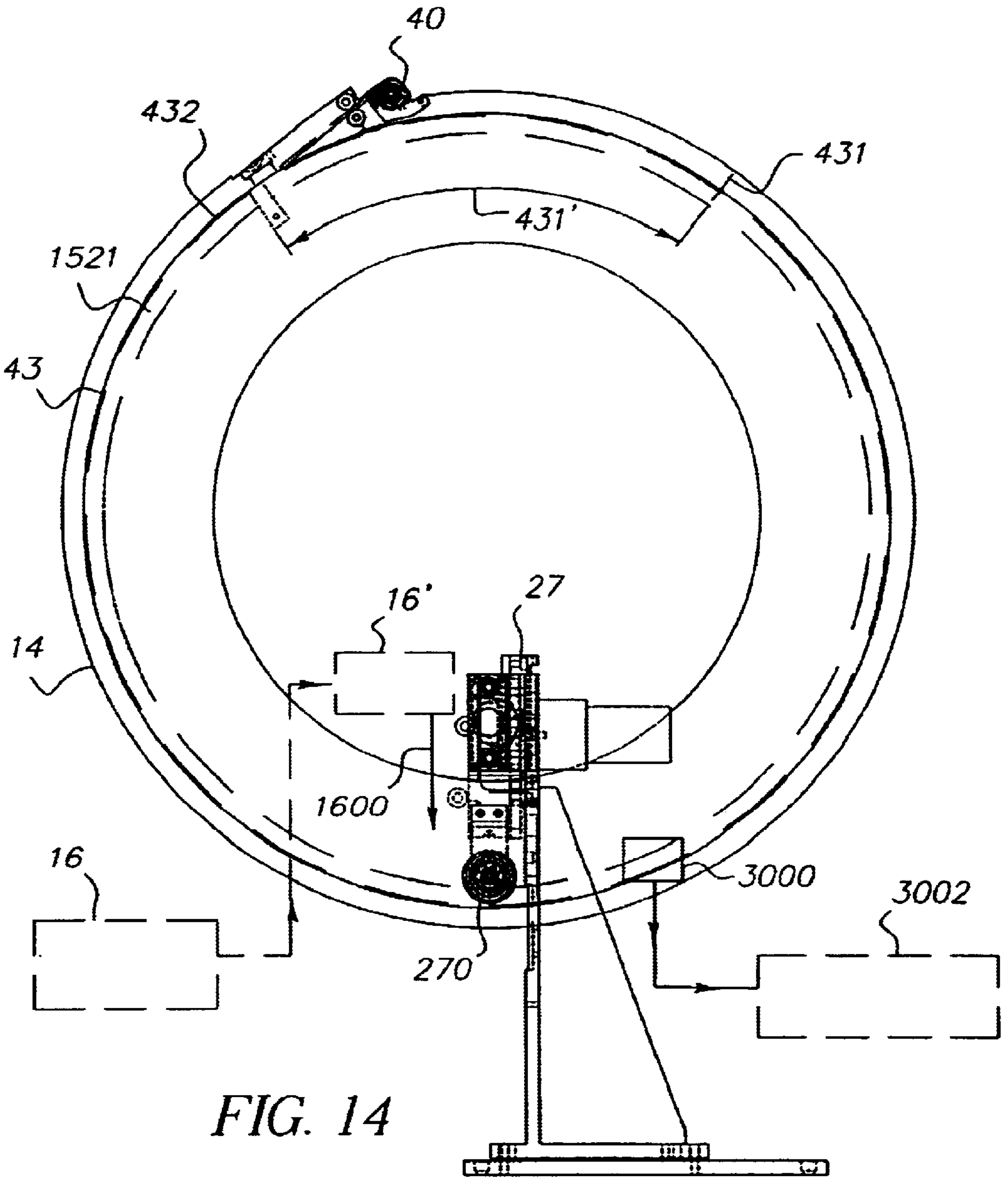
FIG. 14 depicts a sheet of film having a lead end and a tail end within the drum processing cavity of a circular processing drum.

FIG. 14 depicts circular processing drum 14 fully loaded with film 43 having a forward end 431 and a rearward end 432 within the drum processing cavity 1521 of circular processing drum 14. The back end of film 43 is maintained in cartridge 40. Film 43 is now positioned within circular processing drum 14 for chemical processing wherein one or more processing fluids are deposited into circular processing drum 14 and placed in contact with film 43 for a desired period of time.

It is noted that the circumference of the drum will be longer than the length of the film to be processed. Therefore when the film is loaded in drum 14, a section of drum 14 will not have film therein. This is referred to as a film-free zone 431'(FIG. 14). Prior to delivering chemistry by way of chemical supply 16 and a chemical delivery mechanism 16'(FIG. 14), clutch 250 is activated or engaged and drum 14 is controllably rotated with disk 30 so that film-free zone 431' is at a lower end or below chemical delivery mechanism 16'. Chemical delivery mechanism 16' is preferably of the type which drops or delivers chemistry into drum 14 in the direction of arrow 1600 (FIG. 14). The movement of film-free zone to an area below chemical delivery mechanism 16' prior to the delivery of chemicals prevents the chemicals from being dropped directly on the film which could cause uneven processing. Thereafter, processing occurs by continuously rotating the drum 14 and disk 30. Further, as shown in FIG. 14, in the lower portion of drum 14, film 43 passes between wheel 270 and an inner surface of drum 14. Rotation of drum 14 and disk 30 relative to wheel 270 helps to agitate the processing fluid in the vicinity of wheel 270 to promote processing. Drum 14 can be selectively rotated in a continuous or intermittent manner. Following the chemical processing steps, the film 43 is removed from circular processing drum 14 and exposed to a drying operation. One method of removing film 43 from circular processing drum 14 is shown in FIGS. 15A and 15B.

Figure 15A:
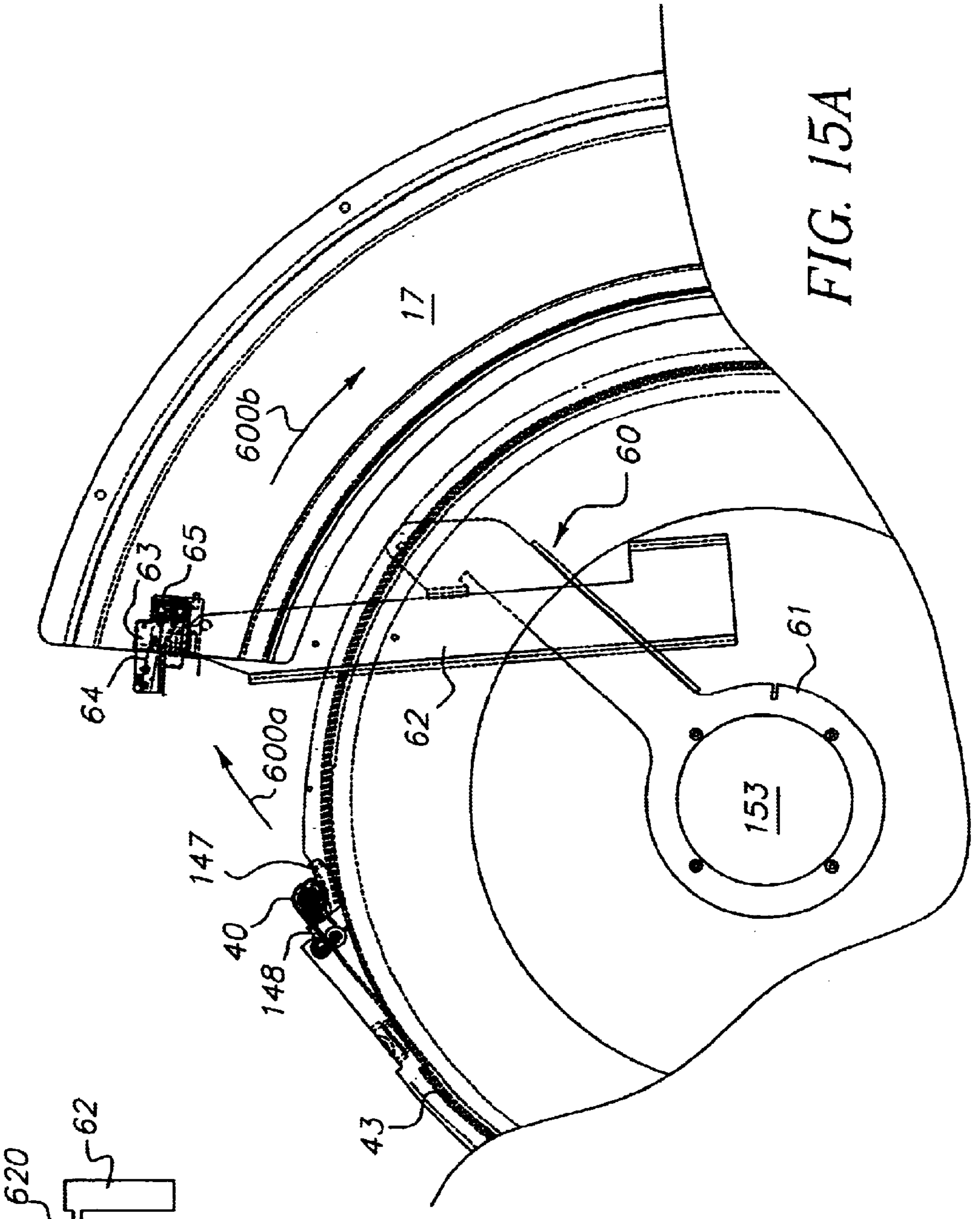
FIGS. 15A and 15B depicts an exemplary film transfer arm, which transfers film from a circular processing drum to a dryer.
Figure 15B:
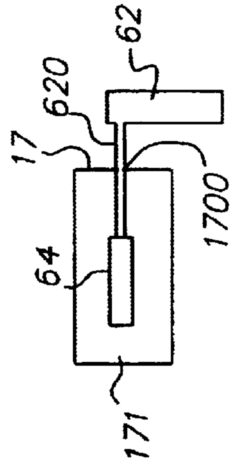

As shown in FIG. 15A, film transfer arm assembly 60 is positioned to move or pivot between circular processing drum 14 and dryer 17. Film transfer arm assembly 60 includes a lower arm member 61, which is rotatable around an axis of symmetry 153 of circular processing drum 14. Film transfer arm assembly 60 also includes an upper arm member 62, which is pivotally attached to lower arm member 61. At upper arm member end 63, film transfer arm assembly 60 includes a film cartridge gripper 64 and film strip gripper rolls 65. As shown in FIG. 15B, which is a front view of the entrance of dryer 17, a side wall of dryer 17 includes a slot 1700 with a rubber seal that extends along the length of the dryer. Upper arm member 62 includes a shaft 620 which extends from upper arm member 62, through slot 1700 and is connected to gripper 64. This permits transfer arm assembly 60 to pull gripper 64 and thus the film to be dried though the dryer.

In embodiments wherein the film 43 remains intact with film cartridge 40 (as described above), film cartridge gripper 64 of film transfer arm assembly 60 engages with film cartridge 40, pulls film cartridge 40 from loading area 147 and the strip of film 43 from circular processing drum 14 in direction 600*a*, and proceeds through dryer 17 in direction 600*b*. Therefore, cartridge 40 with processed film 43 attached and trailing therefrom is conveyed through dryer 17 to dry film 43 by, for example, the blowing of air into dryer or drying cylinder 17. In other embodiments where the film 43 is detached from film cartridge 40 (described below), film sheet gripper rolls 65 grip an edge of film 43 as film 43 exits film input slot 148 of circular processing drum 14. Film sheet gripper rolls 65 of film transfer arm assembly 60 pull film 43 from circular processing drum 14 and proceeds through dryer 17. Once dried, film 43 is rewound back into its cartridge 40 prior to proceeding scanner 18'.

Figure 16:
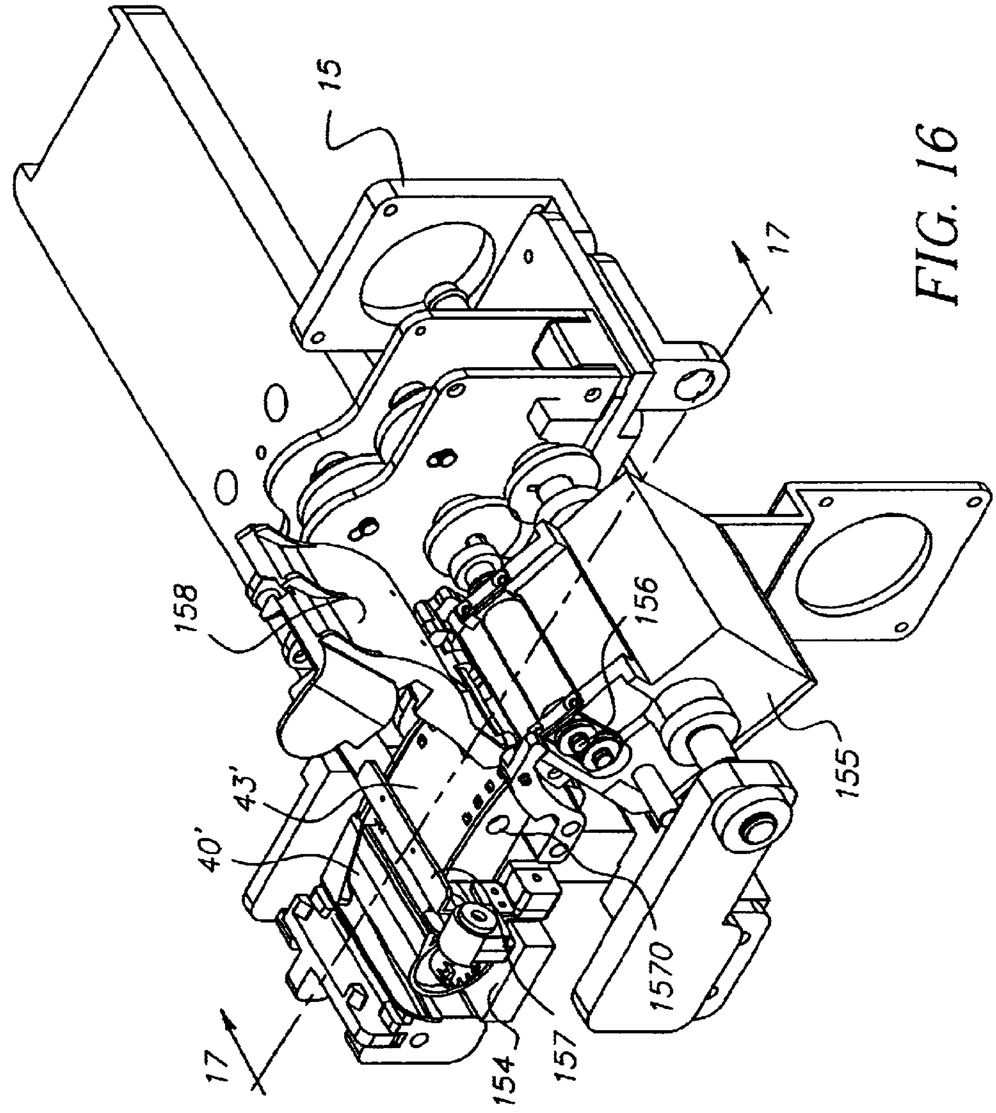
FIG. 16 depicts an exemplary film loading/unloading device used in a film-loading method of the present invention wherein film is separated from its corresponding film cartridge.

In a further film-loading method, the film is separated from its film cartridge prior to processing within circular processing drum 14 (for example, 35 mm film). In this method, a film loading/unloading device, such as exemplary film loading/unloading device 15 as shown in FIG. 16, may be used. Film loading/unloading device 15 includes a film cartridge loading area 154, which can be enclosed by closing a door 158. In film loading area 154, an operator extracts the tongue of film 43' from cartridge 40' and engages the perforations on film 43' with sprockets on a driven roller 1570. Thereafter door 158 is closed and film 43' proceeds into festoon box 155 through festoon box nip rollers 156. Once a desired length of film is removed from film cartridge 40', a cutter 157 slices film 43' to separate film 43' from film cartridge 40'. Any counter device (not shown) may be used to measure the length of the strip of film 43' passing through festoon box nip rollers 156. The length measurement is used in further processing steps as described below.

Figure 17:
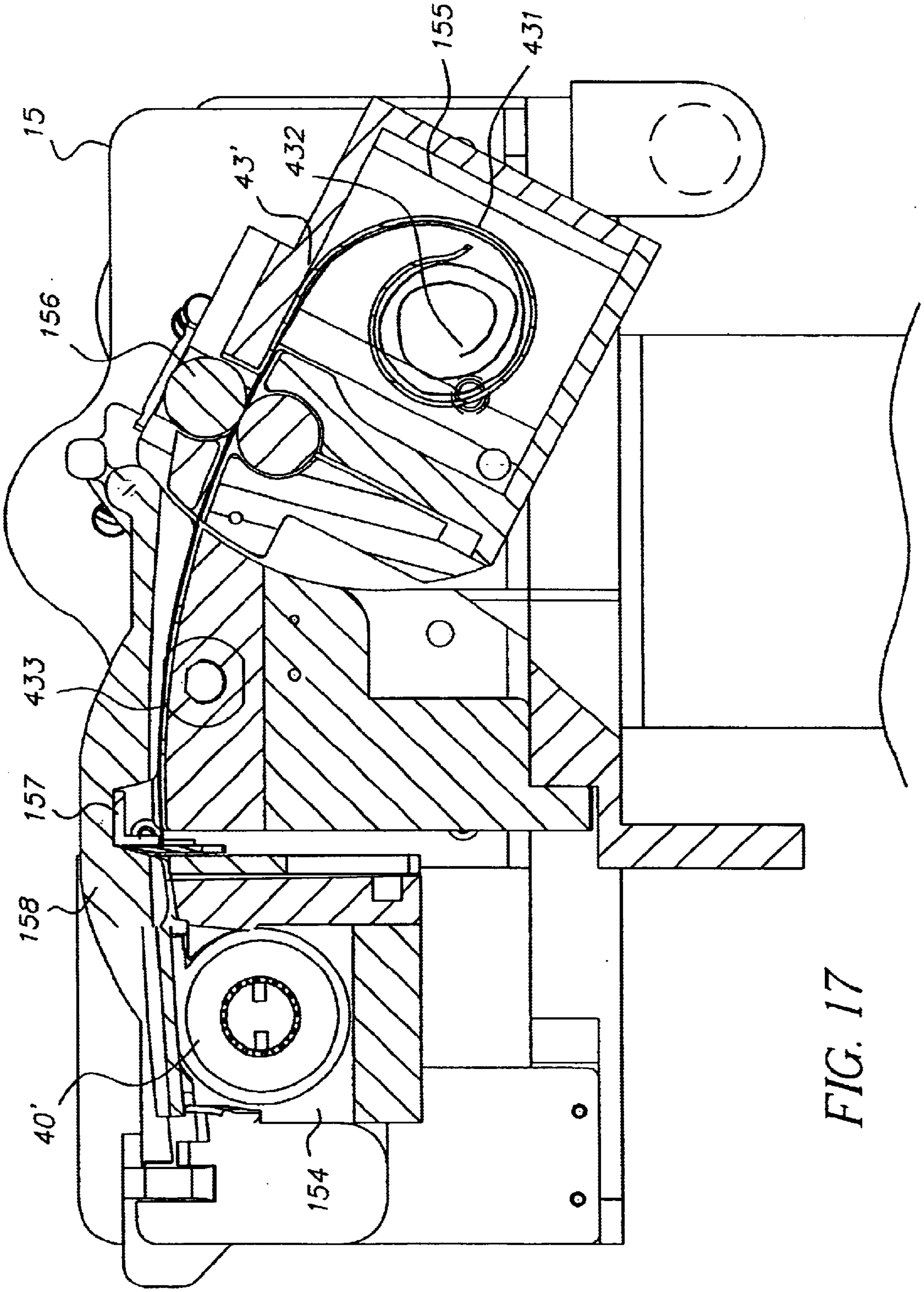
FIG. 17 depicts a cross-sectional view of the exemplary film loading/unloading device as seen along line B—B in FIG. 16.

FIG. 17 depicts a cross-sectional view of film loading/unloading device 15 as seen along line 17—17 in FIG. 16. As shown in FIG. 17, film cartridge 40' is positioned in film cartridge loading area 154 while a strip of film 43' is removed from film cartridge 40' and transported to festoon box 155 where it is turned. In this film-loading operation, a reverse roll of film 431 is formed from the film 43' in festoon box 155. A lead end of film 432 becomes the innermost portion of the reverse roll 431 while a tail end of film 433 becomes the outermost portion of reversed roll 431. When the film 43' is subsequently fed into circular processing drum 14 (as previously described), tail end 433, which contains the last exposures on the strip of film 43', is fed into circular processing drum 14 first.

Figure 18:
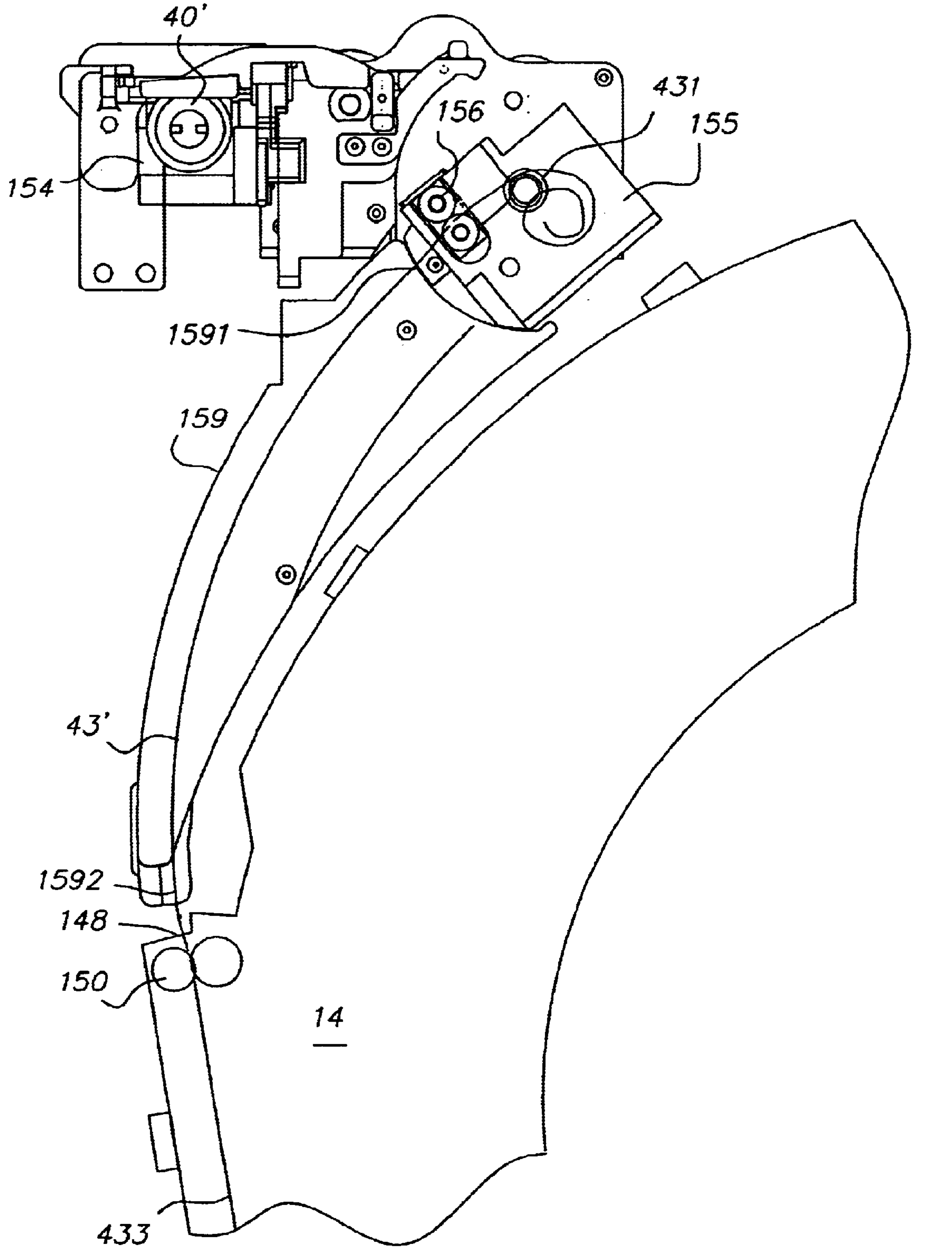
FIG. 18 depicts an exemplary film-loading guide used to load a film roll into a circular processing drum.

A film-loading guide 159 is used to load reverse roll 431 into circular processing drum 14 as shown in FIG. 18. Festoon box 155 rotates from an initial position (as shown in FIGS. 16 and 17) to a film-loading position as shown in FIG. 18. Festoon box nip rollers 156 turn to advance tail end 433 of reverse roll 431 into film-loadidg guide 159 at guide entrance slot 1591. The film 43' exits the film-loading guide 159 at guide exit slot 1592 positioned adjacent to film input slot 148 of circular processing drum 14. Once the tail end 433 of the strip of film 43' enters into circular processing drum 14, driven nip rollers 150 grab the film 43' and advance the film 43' into circular processing drum 14 as described above. It should be noted that in this film-loading method, nip rollers 150 are programmed to advance the film 43' into circular processing drum 14 a specific length, which corresponds to the length of film inputted into festoon box 155 and measured via festoon box nip rollers 156 as described above. In other words, nip rollers 150 advance the strip of film 43' into circular processing drum 14 so that lead end 432 of film 43' remains nipped between nip rollers 150 during chemical processing (i.e., lead end 432 of the strip of film 43' does not enter into drum processing cavity 1521). This permits all of the exposed areas of the film 43' to be in the processing area in the drum.

Figure 19:
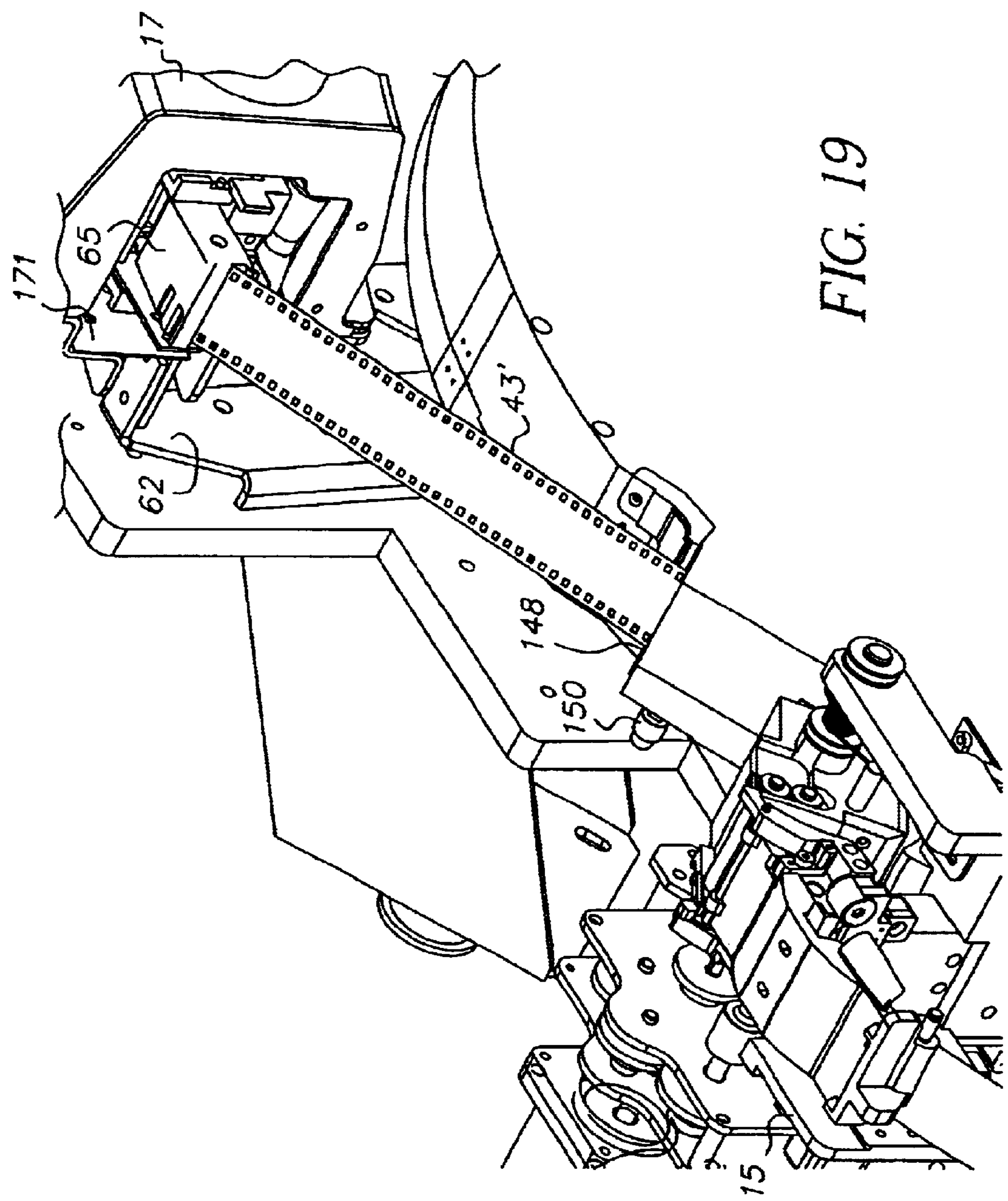
FIG. 19 depicts a film transfer step, wherein a strip of film is transfer from a circular processing drum to a dryer by film sheet gripper rolls attached to a film transfer arm.
Figure 20:
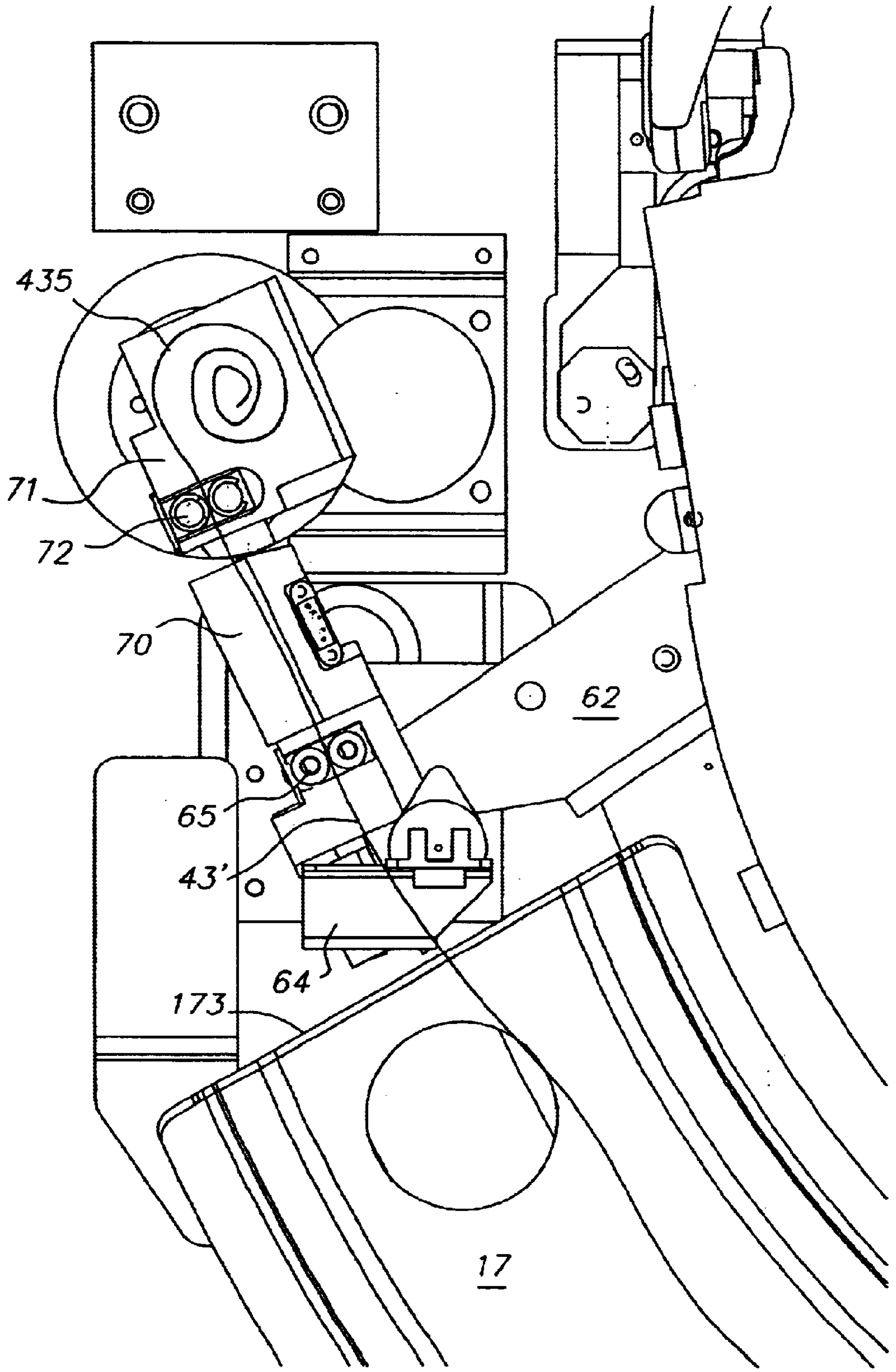
FIG. 20 depicts a film processing step, wherein a strip of film exits a dryer into a scanner festoon box.

Following the chemical processing steps, film 43' is transferred to dryer 17 by film transfer arm assembly 60 as described above. As shown in FIG. 19, the strip of film 43' is pulled from circular processing drum 14 through film input slot 148 by film sheet gripper rolls 65 attached to upper transfer arm member 62. Nip rollers 150 provide a first end (corresponding to lead end 432) to film sheet gripper rolls 65. In FIG. 19, film sheet gripper rolls 65 are shown positioned at dryer entrance 171. From this position, film sheet gripper rolls 65 proceed through dryer 17 pulling the film 43' through dryer 17. As shown in FIG. 20, upper film transfer arm member 62 exits dryer 17 at dryer exit 173 and comes into contact with a conduit 70. Film sheet gripper rolls 65 turn to advance the film 43' through conduit 70 and into scanner festoon box 71. Scanner festoon box nip rollers 72 grasp a leading edge of film 43' and force film 43' into scanner festoon box 71 forming scanner film roll 435. Scanner festoon box nip rollers 72 advance film 43' into scanner festoon box 71 a specific distance equal to the pre-determined length of film 43' so that the tail end of film 43' remains nipped between scanner festoon box nip rollers 72 to go to the scanner.

Figure 21:
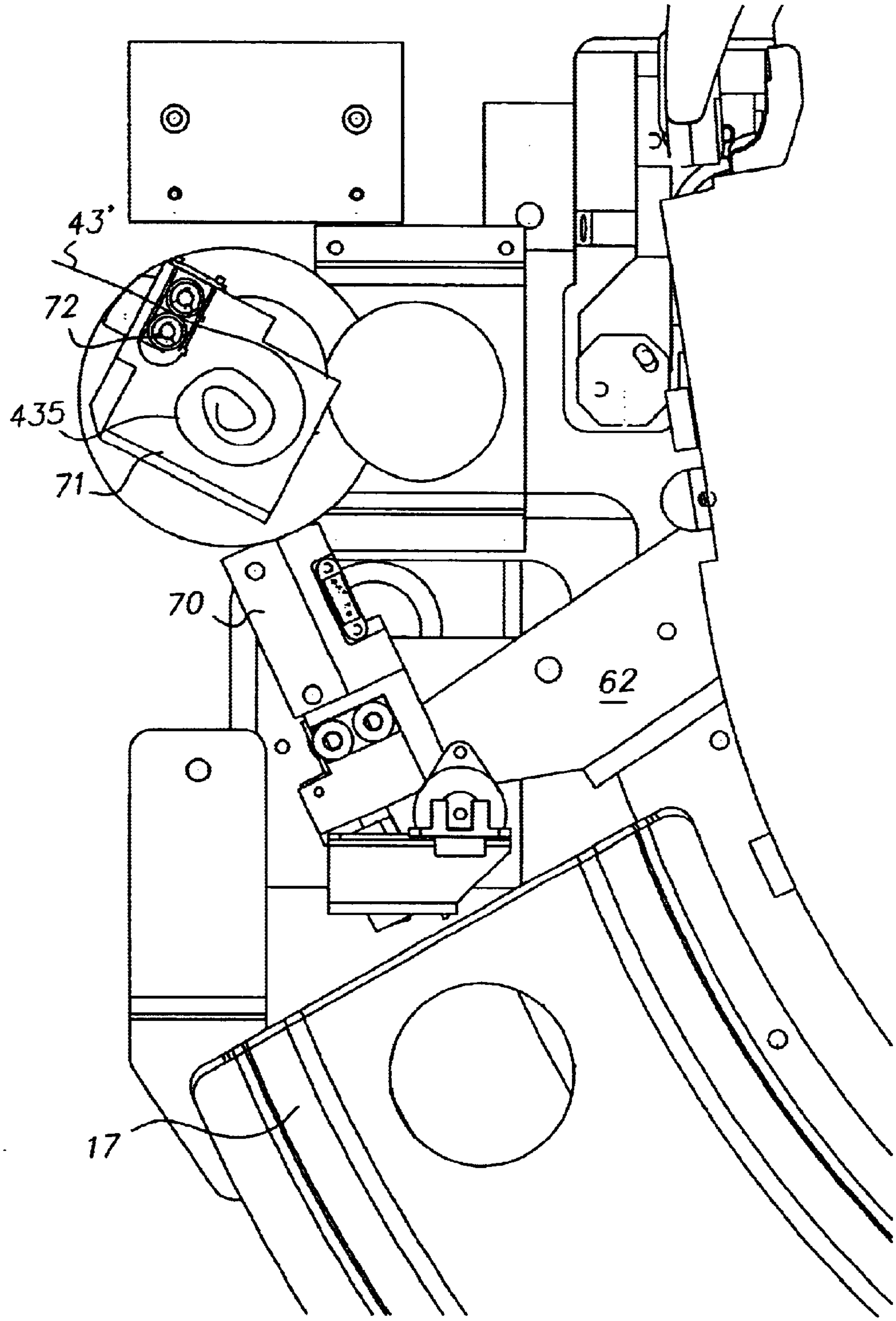
FIG. 21 depicts a film processing step, wherein a strip of film exits a festoon box and proceeds to a scanner.

In one embodiment, film 43' may be further processed by transporting the film 43' to scanner 18'. As shown in FIG. 21, scanner festoon box 71 rotates from an initial position (as shown in FIG. 20) to a secondary position so that the film 43' maybe fed to scanner 18'. Scanner 18' may supply image data to computer 2000 or a remote computer (not shown) for further image processing. Following scanning, the film 43' may be packaged a film roll or as strips of film and returned to the customer along with scanned photographs in electronic format on an electronic disc if desired.

A number of commercially available films maybe loaded according to the film-loading method described above, namely, wherein the film is separated from its corresponding film cartridge during processing. Suitable films, which may be used in this particular film-loading method, include, but are not limited to, 135 mm film. Desirably, 135 mm film is loaded into the photographic processor of the present invention according to this method.

The photographic processor as described may be used to process one or more types of film. Suitable films include, but are not limited to, APS film, 135 mm film, etc. Desirably, the photographic processor is designed to process, APS film, 135 mm film, or both APS and 135 mm film. However, the invention is not limited to APS and 135 mm film and it is recognized that other types of film such as 120 format and 110 format can also be processed in the processor of the present invention. The photographic processor maybe categorized as a "single-roll", "single use" or "batch" processor given that the circular prosing drum only chemically processes one roll of film at a time.

The photographic processor as described may include other components other than those described in FIGS. 1–21. For example, the photographic processor may include an operator interface control panel optionally associated with computer 2000 (FIG. 1); a display screen; a control unit, wherein the control unit accepts input from a processor user, provides machine settings to one or more components of the processor based on the input of the user, and controls and executes a pressing operation of the processor, and multiple film loading doors on an outer surface of the photographic processor housing. In one desired embodiment, the photographic processor is used to process APS film and 135 mm film. In this embodiment, the photographic processor has two separate film loading doors on an outer surface of the photographic processor housing, one for an APS film cartridge and the other for a 135 mm film cartridge.

The photographic processor as described may use any conventional chemical delivery system known in the art as long as the chemical delivery system is capable of inputting one or more processing fluids into the circular processing drum. Suitable chemical delivery systems deliver one or more processing fluids including but not limited to, a developing solution, a bleach solution, a fix solution, a wash solution, a combination or a concentrate thereof. Desirably, the chemical delivery system comprises one or more separate containers for each of the processing fluids. For example, the chemical delivery system may comprise one or more separate containers containing a developing solution, one or more separate containers containing a bleach solution, one or more separate containers containing a fix solution, and one or more separate containers containing a wash solution. In one embodiment of the present invention, the chemical delivery system used in the photographic processor comprises one container of developing solution, one container of bleach solution, one container of fix solution, and at least one container of wash solution.

Desirably, the photographic processor of the present invention utilizes a chemical delivery system comprising "working strength" chemical solutions. As used herein, the term "working strength" is used to describe chemical solutions, which are prepackaged in separate containers at concentrations that do not require dilution with other solutions (i.e., a source of water), and can be used as is. The system can very easily work with concentrates that are measured, diluted and heated on board. They can be diluted with water (if a supply is available) or with a simple rinsing solution that contains water and a surfactant.

Further, the photographic processor as described may use any conventional chemical removal system to remove or discard one or more processing fluids from the circular processing drum. Suitable chemical removal systems include, but are not limited to, a suction device or a drain 3000 (FIG. 14) in the side wall of the circular processing drum. Typically, the chemical removal system further comprises a chemical waste reservoir 3002 (FIG. 14) for storing one or more processing fluids removed from the drum. Desirably, the chemical waste reservoir is designed to contain all of the waste resulting from the use of all of the processing fluids contained in the chemical delivery system.

Figure 22:
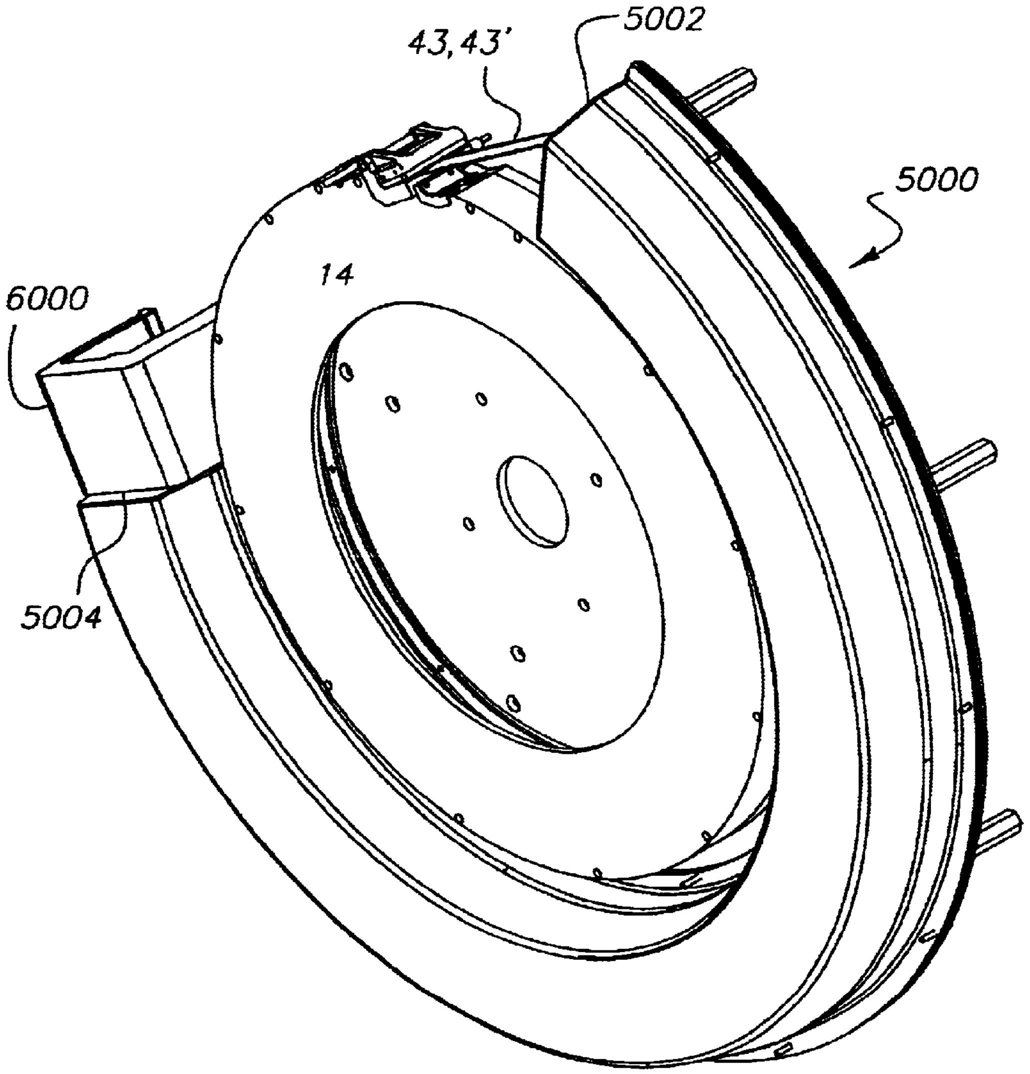
FIG. 22 is a perspective view of a drum processor and circular holding or cueing cylinder in accordance with the present invention.

In the previously described embodiment, photographic material is processed in a drum processor and thereafter, transferred to a circular drying cylinder for drying With this arrangement, when a first roll of film is in the drum processor while a second roll of film is actively being dried, it is necessary to maintain the first roll of film in the drum processor prior to transferring the first roll of film to the dryer. That is, it is necessary to wait for the completion of the drying of the second roll of film prior to the transfer of the first roll of film film the drum processor to the dryer. In order to increase throughput, it is beneficial to get the processed roll of film out of the processor as soon as possible to prepare for the next roll of film to be processed, and cue the removed processed roll of film for drying. In the embodiment of FIG. 22, circular drying cylinder or dryer 17 is replaced by a circular slack box in the form of, for example, a circular holding or cueing cylinder 5000. Circular holding or cueing cylinder 5000 is essentially coaxial with or surrounds processing drum 14 as shown in FIG. 22 in the same manner that drying cylinder 17 surrounds processing drum 14 in the first embodiment.

In the embodiment of FIG. 22, after the photographic media 43 or 43' is processed within processing drum 14 in the manner previously described, the cartridge or film is transferred from processing drum 14 to entrance 5002 in circular holding or cueing cylinder 5000 in a manner similar to the manner described with reference to the transfer of the film film processing drum 14 to drying cylinder 17. That is, as described with reference to FIG. 15A, in an embodiment of the invention where the film remains intact with the film cartridge (such as APS film), film transfer arm assembly 60 is utilized to pull the film cartridge from processing drum 14 and it the same into circular holding cylinder 5000 in a manner similar to the insertion of the film cartridge in dryer 17. Thereafter, the cartridge with the processed film attached thereto and trailing therefrom is conveyed through holding cylinder 5000 and held therein until it is desired to dry film 43 or 43'. In an embodiment where the film is detached from the film cartridge (such as 35 mm film) as also previously described, film transfer arm assembly 60 is adapted to grip and pull the film from circular processing drum 14 and insert the same into circular holding cylinder 5000 in a manner similar to the insertion of film into dryer 17.

With respect to conveying the film through circular holding or cueing cylinder 5000, this is also similar to the manner described with respect to dryer 17 in that circular holding cylinder 5000 includes a slot similar to slot 1700 of FIG 15B, with a rubber seal that extends along the length of holding cylinder 5000. Transfer arm assembly 60 through the use of gripper 64 (FIGS. 15A, 15B) or gripper roll 65 (FIG. 19) is adapted to remove the film from the processing drum and convey the film through holding cylinder 5000 in a manner similar to the conveyance as described with reference to dryer 17.

Once the film is removed from processing drum 14 and held within holding cylinder 5000, it is essentially cued for drying. That is, with this arrangement, once the film within processing drum is processed, it can be immediately removed from processing drum 14 and inserted into holding cylinder 5000 in a manner in which it is cued for drying. Thereafter, a subsequent film can be inserted into processing drum 14 for processing.

When it is desired to dry the cued or held photographic media within circular holding cylinder 5000, it is conveyed through exit 5004 of holding cylinder 5000 and through a linear dryer 6000 such that the film is dried as it is removed from circular holding cylinder 5000. As the processed and dried film exits linear dryer 6000, it can be optionally conveyed to scanner 18' as previously described.

Figure 23:
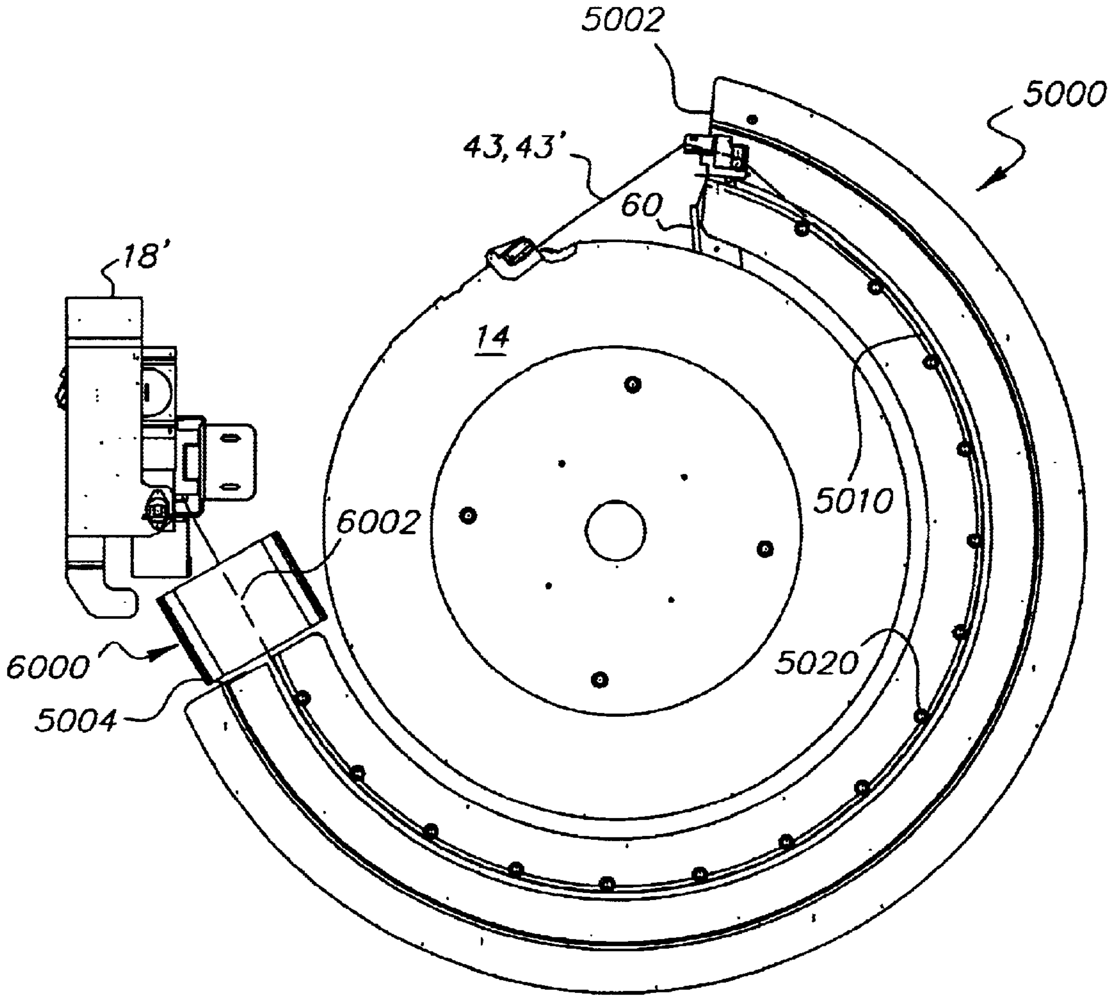
FIG. 23 is a side view of the processor and cylinder of FIG. 22.

With reference to FIG. 23, a side view of the arrangement of the present invention is shown. As shown in FIG. 23, processing drum 14 is positioned so as to be surrounded by circular holding or cueing cylinder 5000. Circular holding cylinder 5000 includes entrance 5002 such that transfer arm assembly 60 transfers the film or the film cartridge attached to the film from processing drum 14 to circular holding cylinder 5000. Circular holding or cueing cylinder 5000 includes a film or media path 5010 which includes a plurality of rollers 5020 which extend in a spaced manner along film path 5010. Therefore, after film 43, 43' is transferred to circular holding cylinder 5000, it is conveyed along film path 5010 through the use of transfer arm assembly 60 in a manner similar to that described with respect to the conveyance of film through dryer 17 by transfer arm assembly 60. Rollers 5020 facilitate the movement of the film along the film path 5010 as the film is conveyed by transfer arm assembly 60 and decrease areas of contact between the film and the cylinder surface.

Accordingly, circular holding or cueing cylinder 5000 is basically a cylinder which permits the cueing or holding of processed film prior to drying. With the arrangement of FIGS. 22 and 23, it is possible to quickly remove processed film from processing drum 14 and cue the film for drying. At the appropriate time based on the operation of the photogenic processor, photographic film held within holding cylinder 5000 is transported out of exit 5004 and through linear dryer 6000 positioned at exit 5004 of holding cylinder 5000. As the film is being removed from holding cylinder 5000, it is dried as it passes through linear dryer 6000. Linear dryer 6000 could be a known dryer attached to a blower, wherein slots or nozzles within linear dryer 6000 are positioned so as to blow drying heated air onto the film as it passes therethough or, can be a radiant heater which applies radiant heat to the exiting film, or can be a combination of a dryer which uses heated air and a radiant heater. In order to provide for a more compact arrangement, as shown in FIGS. 22 and 23, linear dryer 6000 comprises a linear drying path 6002 and is provided so as to be an extension of holding cylinder 5000 and path 5010. After passing through linear dryer 6000, the dried processed film can optionally be provided to scanner 18' as shown.

Therefore, the arrangement of the present invention includes a combination of a processing drum, a circular holding or cueing cylinder and a linear dryer. With the arrangement of the preset invention, it is possible to transfer processed film from processing drum 14 and place the film in a holding or cueing cylinder prior to drying. Further, the elements or components of the processor, circular holding cylinder and linear dryer are positioned so as to provide for a compact arrangement that has a small foot print.

The invention has been described in detail with particular reference to certain preferred embodiments thereof, but it will be understood that variations and modifications can be effected within the spirit and scope of the invention.

What is claimed is:

1. A photographic processor comprising:

a circular processing drum for processing photographic media;

a circular holding cylinder having a circular media path therein, said circular holding cylinder being adapted to receive the processed photographic media from the circular processing drum and hold the processed photographic media therein prior to drying; and a film dryer provided at an outlet of said circular holding cylinder for drying the processed photographic media as the photographic media exits said circular holding cylinder.

2. A processor according to claim 1, where said circular holding cylinder is coaxial with respect to said processing drum.

3. A processor according to claim 1, wherein said circular holding cylinder surrounds said processing drum.

4. A processor according to claim 1, wherein said film dryer comprises a linear drying path.

5. A processor according to claim 1, further comprising a transfer arm for transferring the photographic media from the processing drum to the circular holding cylinder.

6. A processor according to claim 1, wherein said circular holding cylinder comprises a media path and a plurality of rollers positioned in a spaced manner along the media path.

7. A method of processing photographic media, the method comprising the steps of:

inserting photographic media into a circular processing drum;

supplying and discharging processing solution into and from said circular processing drum to process the photographic media;

transferring the processed photographic media from the circular processing drum to a circular holding cylinder which is adapted to hold the photographic media therein prior to drying; and transferring the processed photographic media from the circular holding cylinder to a dryer positioned at an outlet of the circular holding cylinder to dry the processed photographic media as the photographic media is removed from the circular holding cylinder.

8. A method according to claim 7, wherein said circular holding cylinder is coaxial with respect to the circular processing drum.

9. A method according to claim 7, wherein said circular holding cylinder surrounds the circular processing drum.

10. A method according to claim 7, wherein said dryer comprises a linear drying path.

* * * * *

UNITED STATES PATENT AND TRADEMARK OFFICE

CERTIFICATE OF CORRECTION

PATENT NO. : 6,722,797 B1
DATED : April 20, 2004
INVENTOR(S) : Ralph L. Piccinino, Jr.

It is certified that error appears in the above-identified patent and that said Letters Patent is hereby corrected as shown below:

Column 14,
Line 23, after "claim 1" delete "where" insert -- wherein --
Line 46, after "the" insert -- processed --.

Signed and Sealed this

Twenty-third Day of November, 2004

JON W. DUDAS
*Director of the United States Patent and Trademark Office*